US008615520B2

(12) United States Patent
Fallah

(10) Patent No.: US 8,615,520 B2
(45) Date of Patent: Dec. 24, 2013

(54) COMPUTER BASED METHODS AND SYSTEMS FOR ESTABLISHING TRUST BETWEEN TWO OR MORE PARTIES

(75) Inventor: Farzan Fallah, San Jose, CA (US)

(73) Assignee: Idelan, Inc.

( * ) Notice: Subject to any disclaimer, the term of this patent is extended or adjusted under 35 U.S.C. 154(b) by 138 days.

(21) Appl. No.: 12/981,391

(22) Filed: Dec. 29, 2010

(65) Prior Publication Data

US 2011/0167059 A1 Jul. 7, 2011

Related U.S. Application Data

(60) Provisional application No. 61/293,050, filed on Jan. 7, 2010, provisional application No. 61/383,698, filed on Sep. 16, 2010.

(51) Int. Cl.
*G06F 17/30* (2006.01)

(52) U.S. Cl.
USPC ........... 707/755; 707/706; 707/722; 707/736; 707/752; 707/754; 707/756; 707/757; 707/758; 707/781; 709/227; 709/205; 709/206; 726/5; 726/6; 705/14.53

(58) Field of Classification Search
USPC ......... 707/706, 722, 736, 752, 754, 755, 756, 707/757, 758, 781, 999.004; 709/205, 206, 709/227; 726/5, 6; 705/14.53
See application file for complete search history.

(56) References Cited

U.S. PATENT DOCUMENTS 7,162,475 B2 1/2007 Ackerman
7,246,067 B2 7/2007 Austin
2002/0194049 A1* 12/2002 Boyd ................................ 705/9
2003/0200217 A1 10/2003 Ackerman
2004/0205002 A1 10/2004 Layton
2005/0198031 A1 9/2005 Pezaris
2006/0010467 A1 1/2006 Segel
2006/0059159 A1 3/2006 Truong
2006/0287928 A1 12/2006 Terrill
2007/0124226 A1 5/2007 Garner
2007/0266033 A1 11/2007 Kelly
2007/0288464 A1 12/2007 Silver
2008/0059217 A1 3/2008 Austin
2008/0172485 A1 7/2008 Du
2008/0288299 A1 11/2008 Schultz
2009/0031030 A1* 1/2009 Schmidt ........................ 709/227
2009/0119299 A1 5/2009 Rhodes
2009/0169062 A1 7/2009 Cheung
(Continued)

*Primary Examiner* — Syling Yen

(74) *Attorney, Agent, or Firm* — Jennifer Meredith, Esq.; Fariba Sirjani, Esq.; Meredith & Keyhani, PLLC

(57) ABSTRACT

Methods, devices and systems for moderating and policing voluntarily established transparency regarding past and present, and personal and professional relationships via online networking services. Identity of a person or commercial entity is verified before registration as a user. Each user is permitted a single profile. A profile includes a record of all relationships entered in the profile, some of which may be hidden by user. Each user is capable of linking his profile to profiles of other consenting users. Owner of a profile may flag inaccurate information on other linked profiles. The reliability or value of information in a profile is measured as a function of duration of existence of profile, transparency of the information in the profile, periods of inactivation, and number of times the profile is correctly flagged. A code is generated and used to allow gradual exposing of the profile of a user to his prospective contacts.

20 Claims, 13 Drawing Sheets

(56) References Cited

U.S. PATENT DOCUMENTS

| | | | | |
|---|---|---|---|---|
| 2009/0178125 | A1* | 7/2009 | Barber et al. | 726/6 |
| 2009/0228294 | A1 | 9/2009 | Choi | |
| 2010/0005520 | A1* | 1/2010 | Abbot et al. | 726/6 |
| 2010/0011431 | A1 | 1/2010 | Cynkin | |
| 2010/0250330 | A1* | 9/2010 | Lam et al. | 705/10 |
| 2011/0131114 | A1* | 6/2011 | Al-Mubarak et al. | 705/27.1 |
| 2012/0030193 | A1* | 2/2012 | Richberg et al. | 707/719 |
| 2012/0054053 | A1* | 3/2012 | Cheek et al. | 705/26.1 |
| 2012/0102523 | A1* | 4/2012 | Herz et al. | 725/34 |

* cited by examiner system

Method

Method

Registration

Search and request for add

Figure 5
Search
Susan Jackson searches for the name "John Smith"
Your search returned three profiles. Click on the picture of the person you are looking for to see all his pictures.
If you don't see the picture of the person here, you can email him a request to create a profile.
jsmith
Uploaded on Jan 4, 2009
johnS
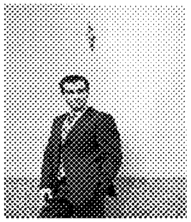
Uploaded on Nov 23, 2005
dragon
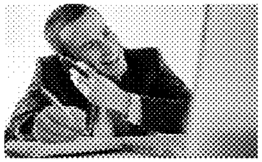
Uploaded on July 24, 2008

Add and flag

Figure 7

Add

- Her add request is accepted by John Smith, so Susan can see his profile.
- John can also see Susan's profile.

John Smith , johnS (RCS = 658)

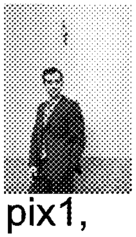

History:
Nov 23, 2005 (created profile)
Nov 23, 2005 (uploaded pictures pix1, pix2, pix3, pix4, and pix5)
Nov 25, 2005 (married to P1)
Feb 10, 2006 (deleted P1)
Feb 10, 2006 (changed the status to divorced)
July 12, 2006 (uploaded a new pic (pix6))
July 14, 2006(dating P2)
Aug 2, 2006 (deleted P2)
Jan 4, 2007 (subscription expired)
Mar 2, 2008 (renewed subscription)
Apr 3, 2008 (dating Mary White)
May 24, 2008 (deleted Mary White)
Dec 22, 2009 (dating Susan Jackson)

Code generation
8000
start
User A logs in
Generates a code
Sends the code to user B
User B logs in
User B enters the code to see some or all of the User A's information (e.g., active/inactive status, RCS)
User A receives some or all of User B's information (e.g., active/inactive status, RCS)
end
8007
8001
8002
8003
8004
8005
8006

Flagging

Registration

Search
start
12000
User enters the person's name
12001
Computer searches the database to find all exact and approximate matches
12002
One or more matches found?
12003
Y
N
Computer provides pictures of the matches
12004
User looks at all pictures
12005
Found the person?
12006
Y
N
Send an add request if desired
12007
Send an invitation to join if desired
12008
End
12009

COMPUTER BASED METHODS AND SYSTEMS FOR ESTABLISHING TRUST BETWEEN TWO OR MORE PARTIES

CROSS-REFERENCE TO RELATED APPLICATIONS

The present application claims priority to and the benefit of the U.S. Provisional Patent Applications No. 61/293,050, filed on Jan. 7, 2010, and No. 61/383,698 filed on Sep. 16, 2010, in the United States Patent and Trademark Office, the entire content of both of which is incorporated by this reference.

BACKGROUND OF THE INVENTION

1. Field of the Invention

The invention relates, generally, to computer-based online information registry and exchange, and, more particularly, to moderated online networking services.

2. Description of Related Art

Online dating or Internet dating is a dating system which allows individuals, couples, and groups to make contact and communicate with each other over the Internet, usually with the objective of developing a personal relationship. Online dating services usually provide un-moderated matchmaking over the Internet, through the use of personal computers or cell phones. Online dating services generally require a prospective member to provide criteria about the desired match before the service provider can search the service provider's database for individuals who match the criteria set by the prospective member. The criteria may include age range, gender, and location. As such, searching according to a generic criterion may return a large group of members.

A variation of the online dating model has emerged in the form of introduction sites. Introduction sites differ from the traditional online dating model by introducing members to other members, whom the site deems compatible, thus claiming to eliminate much of the mayhem of traditional online dating.

Finally, professional networking and social networking services allow each user to connect to a list of business associates or friends. Typically, in professional and social networking, the larger the number of associates or friends of each user, the greater the bragging rights of the user. Therefore, these sites also allow each user to view the contacts of the other users, who are linked to the user, in the hopes of enlarging his network.

Online dating is fraught with issues arising from dishonesty. Online predators, pretending to be someone they are not, and bait profiles, set up by the online dating service to attract clients, are two examples of problems associated with online dating services.

A suspect date or contact may be investigated to some degree using the internet as well. Online services also include companies that provide background checks regarding a person of interest. Such services mine the public records for previous names and addresses of the person and other personal data such as the date of birth of the person. These services may also provide the names of parents and siblings of the person being checked.

Both online dating and professional and social networking have real world counterparts. A person may meet a potential mate or be introduced to her at a party or elsewhere in the brick and mortar world and a professional may form a potentially productive association with another professional at a trade show or a conference. The real world counterpart of online background check services is asking a common friend or acquaintance about the person he has just met.

BRIEF SUMMARY OF THE INVENTION

In both romantic and professional contexts and whether it is online or in person, meeting others is merely a first step. Some relationships are valued according to quality and quality is at least partially determined by the degree of fidelity of parties to the relationship. A potential suitor may not wish to expend time, energy, and money in pursuit of someone who unbeknownst to the suitor is already in a committed relationship. Similarly, a commercial entity may not wish to hire a vendor who has a relationship with a competitor of the commercial entity and is in a position to share the entity's intellectual property, including trade secrets, with the competitor. Online and offline dating and networking services and mechanisms provide the means of introduction and may even engage in matchmaking between their users. However, the existing services do not filter for or flag dishonesty. Online background check services are limited in that they are expensive and rely on public records. A real world background check cannot be extensive and is tainted with the biases and interests of the person referred to for information.

The un-moderated and un-policed transparency of a person or entity, for example, on a social networking site is only as reliable as the level of integrity of the person or entity that is providing the information. Such bootstrapping does not yield a high level of confidence. Accordingly, there is a need for an online service that would oversee, encourage, or moderate transparency that is voluntarily established and maintained by a person or an entity with respect to other persons or entities in a relationship.

Aspects of the present invention address the shortcomings of the existing online networking and background check services by providing methods, devices, and systems that foster, moderate, and police the establishment and maintenance of transparency regarding past and present relationships. The transparency is voluntarily established and maintained is in contrast to obtaining information behind someone's back and is therefore conducive to mutual trust. Aspects of the present invention include further features not currently available in any of the existing online services. Aspects of the present invention provide a method for measuring the degree of worthiness or value associated with the profile and the information in the profile of a user of the aspects of the present invention. Aspects of the present invention provide a measured and gradual method for exposing some information of the profile of a user to another user. Worthiness or value of information, at times, indicates the reliability of the information and is a measure of how trustworthy the information may be. A number of criteria are utilized to establish the degree to which the truth of the information may be trusted and its reliability and a score may be attributed to the reliability or value of the information.

Typically, the older the profile, the higher the profile score. Also, the more information in the profile, the higher its score. Thus, a high score profile may be said to have a higher value. As such, typically a higher score merely indicates that the profile is older and has more information. At times, but not always, the age and the amount of information in the profile may be an indicator of reliability and trustworthiness of the information in the profile.

Aspects of the present invention provide a machine-implemented online service to registered users of the service who wish to ascertain the truthfulness of an associate in romantic or business relationships. Systems and devices that embody the aspects of the present invention permit a prospective user to register with the service and establish a profile. The profiles are maintained in a database, which may be located at a central location or distributed among networked locations, and are subject to custody and control of a moderator or a system administrator. The profile of each user includes information that is pertinent to the relationship at issue. A user is not permitted to have more than one profile. In one embodiment, a profile, once created, may no longer be deleted by the user. In one embodiment, the deletion of the profile is allowed. In one embodiment, when a profile entry is modified, a history of the entry before the modification went into effect is also preserved and displayed in the profile. To preserve the history, for example, an entry describing the modification is added to the profile. The user may inactivate his account or otherwise make his profile inaccessible to other users. However, inactivation is effective with respect to all other users and may not be used selectively against some. Moreover, upon reactivation, the user may not sua sponte erase the old information to rewrite history. Old relationships remain on the profile and if they have ceased to exist, they will be marked as such without being removed.

In an alternative embodiment, a user may be given the option of making an entry on his profile invisible to others. This may be allowed for non-current relationships only or after certain amount of time has passed since the activity is performed.

Thus, use of and subscription to a service, that embodies aspects of the present invention, is voluntary and the transparency that is provided to other users is also voluntary. Yet, inclusion and modification of the information is subject to control by the system administrator. Some pieces of information are verified against government records before they become part of the profile and other pieces of information gain credibility by the length of time that they remain visible to others without being challenged or changed. The system administrator also ensures that each user has a single profile that is either active such that its existence is ascertainable by all other users, or inactive such that it is inaccessible to all interested users alike.

In an alternative embodiment, the option of flagging is not provided and the users are not permitted to challenge the information of another user.

Registration usually precedes the formation of a profile. Each user must sign up or register first. During the registration stage, a user is prompted to enter certain registration information regarding himself. The steps taken by each user to register and the information shared with other users are designed to prevent fraud. For example, aspects of the present invention prevent a user from creating multiple profiles under different names. Aspects of the present invention also prevent a user from creating a profile and using it in some cases, but denying the existence and ownership of the profile in other cases. On the other hand, the aspects of present invention allow for anonymity by providing a way for a sender to share certain information, without disclosing the sender's name, with a receiver such that the receiver can ascertain that the information belongs to the sender.

Each user can link his profile to another user's profile. Linking of the profiles is accomplished by the first user sending a request, alongside some information describing the relationship between two users, to the second user. Upon accepting of the request by the second user, the two profiles are linked. Linking indicates a relationship and an entry indicating this linking event will be added to the profiles of both users. After the linking, the first user can see all or some of the information on the profile of the second user. Similarly, the second user can see all or some of the information on the profile of the first user.

A first user may instead generate a code on the website providing the service and send it to a second user to let the second user see some of the information corresponding to the first user. The code may be generated and sent by the first user together with or prior to an add request by the first user. The second user may use the code to view a select portion of the first user's information. Many applications of the aspects of the present invention pertain to users who know one another and have already formed some type of a relationship. However, the aspects of the present invention may be utilized also before the formation or at initial stages of a relationship. In one embodiment, the information exchange does not include the names of the users, thus providing a way for the users to exchange information anonymously. In one embodiment, the aspects of the present invention permit a first and a second user, who are both linked to a third user, to exchange information in one or more steps, each of the first and second users revealing incrementally more information at each step.

The profile information that is subject to exchange by using the code may include pictures, the dates the pictures were uploaded, a value, trustworthiness, reliability or credit score associated with the information, the current active or inactive status of the profile, the number of profiles linked to the profile, the types of the relationships, categories, and/or keywords corresponding to the profiles linked to the profile. Furthermore, a text provided by person generating the code may be displayed upon using the code. The text can be used to assure the recipient of the code that the code is generated by the same person that is sending the code to the recipient. This can be achieved by, for example, writing the email address of the person generating the code in the text or writing a unique ID of the sending person in another website, in the text. The identifying text is used to prevent a scenario where A asks B to send him a code and then sends the code generated by B, which provides access to B's information, to C. If A's credibility score is low, and he has a friend B with a high credit score, then, in order to woo C, A may wish to lead C to B's profile to and pretend that he is B. A may not know B and still ask for B's code, only to send it to C. Using an additional identification means, such as text, associated with the code is intended to prevent this scenario. For providing additional assurance, one or more of the date of birth, part of the date of birth, age or an approximation of the age, the address of the owner of the profile, part of the address of the owner of the profile such as country, state, province, city, and/or zip code of the owner, the date of the last verification of the address or other information may be displayed to the person viewing the profile. If the owner of the profile is a non-person entity, the information such as the name of the entity, registration date, and the address of the main office are displayed to the person viewing the profile.

To provide reciprocity, if the second user uses the code to view the information pertaining to the first user, then some or all of the above information corresponding to the second user becomes visible to the first user. In one embodiment, the information of the second user may be sent by electronic mail, text message, voice or any other means to the first user.

The generation and use of the code to provide limited access to another profile may be used prior to linking of two profiles, for example in a matchmaking situation when A knows B and C and want to introduce B to C and B and C wish to know some information about each other before they decide to link their profiles. As another example, this exchange of information can be used when two users meet on an online dating website and want to exchange some information anonymously before deciding to invest more time in the interaction.

The code generated by aspects of the present invention may be a random code. The code may expire after certain number of usages, after a predetermined time has elapsed from activation or after a predetermined time has elapsed from its first use. In one embodiment, the information of the first user may be continuously visible to the second user and vice versa possibly until the code expires.

In one embodiment, a link, such as a URL, may be generated and used in place of a code.

In one embodiment, the person receiving the code or the link may be able to access the information even if the person is not a registered user of aspects of the present invention.

This exchange of information enables verifying the membership and the value, trustworthiness, reliability or credit score of a first user without knowing the first user's name. This can be used for example, in an online job bidding website, where two users have not revealed their names to each other due to privacy concerns, but each person would like to make sure that the other entity has a profile and possibly wishes access some of the profile's information before investing more time toward forming a relationship with the other entity.

Aspects of the present invention may calculate a score for a user to provide an easy way for other users to gauge the value of the information on the user's profile. Typically, the credit score merely indicates the age of the profile and the amount of information in the profile. However, the length of time that information remains unchanged on a profile is an indirect indicator of truthfulness and thus reliability of this information. Moreover, the greater the amount of information that remains unchanged, the greater the overall reliability or value of the profile. The score may, therefore, be considered a measure of the reliability, worthiness or value of the information on a profile and thus the trustworthiness, reliability or credibility of the user associated with the profile. The score may be called a credit score.

For example, the score for a first user may be a function of one or more of the length of the time the first user has been a member, the length of the time the first user's profile has been active, the number or the percentage of the names on the first user's profile which have been withheld and may not be viewed by another user, the number or the percentage of the entries on the first user's profile which have been withheld and cannot be seen by another user, and the number of times the profile of the first user has been flagged by others. The higher the length of the membership and the length of the time during which the profile has been active, the higher the score. The higher the number of blocked names and the number of times the profile was flagged, the lower the score.

In one embodiment, the score may be a number between 0 and 700, analogous to a financial credit score. In one embodiment, a non-numerical score may be computed and provided. The non-numerical score may use four values of Very Good, Good, Bad, and Very Bad. Aspects of the present invention may display the above score in all or some of the places where information corresponding to a user is displayed.

In one embodiment, the aspects of the present invention decide and determine which pieces of information from each user to reveal to the other user.

In one embodiment, the aspects of the present invention process the information provided by the users, to suggest to two users to interact and exchange information when the information of each user may or may not be visible to the other user. This aspect provides a matchmaking function. Matchmaking could be applied for personal or professional relationships.

In one embodiment, the aspects of the present invention are used during online or offline dating to indicate serial monogamy or by people in a committed relationship to demonstrate faithfulness to the other partner.

In one embodiment, the aspects of the present invention can be used to establish trust among a client and a provider. For example, a provider who is hired for a job by a client may have agreed to assign any intellectual property that is produced in the course of his employment to the client. Then, utilizing the aspects of the present invention would engender some level of confidence in the client that the provider will not sell the intellectual property to another one of the provider's clients. The methods and systems of the present invention may also assist the current client determine that the provider is selling the intellectual property of another client to the current client.

In addition, aspects of the present invention may allow a user to register just to access a subset of the functionalities of the website. For example, the user may only wish to conduct search to see if a specific person or entity has a profile. Further, it may provide another type of membership, which can be used by two persons who are already in a work relationship. This type of account may for example be started by an employer or a client and an invitation may be sent to the other entity who may be an employee or a provider. Upon creation, this type of account may have some preset information such as the work relationship type. Both entities will go through verification steps to verify their information. The two account holders may have access to a subset of the functionalities of the service. Furthermore, searching for an entity that has this type of account may return the names of both holders of the account.

In one embodiment, instead of two users, the relationship is between two groups of users.

In one embodiment, aspects of the present invention can be used to establish trust between a party who submits a proposal to another party and the party receiving the proposal. The proposal may be for a work contract or a research grant, for example. Aspects of the present invention can be used to provide confidence to the recipient of the proposal that the proposal has not been or will not be submitted to a third party. Each party may include one or more persons, institutes, or legal entities acting together.

In one embodiment, aspects of the present invention can be used to establish trust among two or more parties to an agreement when the signing parties wish to make sure that none of them will sign a similar agreement with another party. For example, the signatory parties to a non-disclosure agreement may wish to ensure that none of them would sign another non-disclosure agreement with another party on the same topic or any agreement with another party for working on a given topic.

The aspects of the present invention include and utilize one or more computers that run one or more databases. The computers may use one or more web servers to provide a service in accordance with the aspects of the present invention for the users of the service. Computers and data bases are used to store and retrieve information and provide different mechanisms to search and retrieve complete or partial information profiles of the users.

Section 1 below describes one exemplary application of the aspects of the present invention for establishing trust between parties involved in a romantic relationship. Section 2 describes an exemplary application of the aspects of the present invention for establishing trust between a client and a provider in a professional and commercial relationship.

Section 1: Romantic Relationship

The popularity of online dating has made it easy to create an online profile and seek potential dates. Unfortunately, some of the users of such services are already in a relationship that they fail to disclose to their online friends. Even in the brick and mortar world when a job keeps a person on the road, misrepresenting one's relationship status may be as easy as taking off the ring. Some people do not care about the relationship status of a person they meet. This invention is for those who do.

There is currently no easy way to ascertain the relationship status of a person who is, for example, engaged or dating. While it is possible to run a background check to find some information such as a person's marital status, many existing background check services rely on databases which are not accurate. Moreover, other types of information such as whether the person has a boyfriend or a girlfriend or whether the person is dating someone else are generally not available on a public database. Performing a background check before dating every new person or before investing time in exchanging messages with a prospect is costly, time consuming, and impractical. Additionally, background checks are ineffective in that, at best, they provide a point check along a continuum of events. In contrast, aspects of the present invention may be used to provide a continuously updating view on a person's relationship status if he wishes to remain transparent. Finally, background checks are perhaps an appropriate tool for moving toward divorce and litigation. On the other hand, their intrusive and rude connotation does not make background checks conducive to forming a relationship.

Other than dating websites that cater specifically to married people who want to cheat, an online dating service impliedly caters to users who are single. Yet, while some of the current social networking services include a relationship status indicator, this indicator is completely under the control of the user such that it can be changed anytime the person wishes and it can be visible to some and invisible to others. Furthermore, typically a user can create more than one account on a social networking site and each account can be under any name. Thus, a user may create one account to interact with his wife and another account, under a slightly different name, to interact with his girlfriend. Because there is no requirement of using a clear photograph of the person, the user might upload an unclear picture of himself or the picture of his dog on his profile so nobody looking at the profile can tell the profile belongs to him. As such, this type of status indicators are no help in exposing the liars. This shortcoming of the online, and at times in-person meetings, creates a demand for a service which informs its subscribers of the relationship status of other subscriber with a measurable degree of reliability. The data on one user's profile is subject to search and, in some embodiments, objection by other users who are linked to him and view his profile such that the inaccuracies introduced by a user into his profile are subject to being weeded out over time. Thus, registering with such a service and having a profile on it enables other users of the service to view a relationship status that may be based on more than just the user's word. Moreover, the users can view a profile only after they get permission from the owner of the profile. Thus, privacy of each profile is maintained. On the other hand, because deleting the link with another user is recorded in the history and will become known to the user who has been deleted, cheating is limited.

Additionally, membership in such a service can provide an edge in the highly competitive dating market as membership shows that there is a way to check whether or not the member is currently in a relationship. Another benefit is showing faithfulness to an existing partner because registering with such a service enables others to find about one's existing relationship with his partner. Thus, a person who registers with the service effectively announces the existence of his relationship to his community and shows his partner that he is not hiding the relationship.

The provision of most information by a user is completely voluntary. Mandatory information to be provided by a user are only those indicators of his identity which are required for setting up an account for him. The system and the method merely remove, reduce, and restrict the opportunity to misrepresent either the initially provided information or changes in the information of the user.

Section 2: Business Relationship

While the above description is applicable to all types of relationships where some type of fidelity or exclusivity is desirable, an application in the context of business and professional relationships is further described below.

One of the issues associated with hiring a consultant, a contractor, a vendor, or another type of parts or service provider is the difficulty of protecting the intellectual property that is produced during the performance of the job. While it is common to ask the provider to sign non-disclosure agreements or agreements to assign all intellectual property rights pertaining to the performance of the job to the client, there is no guarantee that the provider will respect the agreement. In many cases, detecting the breach is extremely difficult if not impossible. As an example, a consultant hired by a company A to write an application program, which will be used in-house by company A, may sell the same program as an original creation and assign the intellectual property rights to another company B, possibly a competitor of A. This may not be easy to detect as the program is used in-house. As another example, an interior designer who is hired to remodel a house may sell the same design to another client. Aspects of the present invention help the client obtain some level of confidence that such violations will be detected.

As mentioned above, the term intellectual property refers to tangible or intangible products and information that are intended to be kept secret or are otherwise proprietary. Creations, derivations and non-technical business information fall under this category.

The user can be a person acting on behalf of an entity such as an officer of a corporation or organization. The registration is done by providing some information about the entity, the officer, or both the officer and the entity to the system. The information may include the name of the entity, the location, city, state, or country where the entity is incorporated or otherwise registered, the year of the registration, the tax identification number or any other identification number uniquely identifying the entity, and the address of the main office of the entity that determines its principal place of business.

A verification step is used to verify one or more pieces of the said information that are considered necessary by the methods and the systems of the present invention for establishing the identity of the entity. In one embodiment, for verifying the address of the person or the entity, a letter may be sent to the address provided by the user and the user will be asked to login to the website and enter a random code written on the letter to the website to complete the registration process. In one embodiment, the carrier delivering the letter may be required to check the ID of the person accepting the letter to make sure the name on the letter matches the name on the ID. In one embodiment, the information provided by the entity will be verified against available data bases of incorporated companies and organizations.

Aspects of the present invention, further, prevent creating more than one profile corresponding to each entity. If an applicant entity has the same name, and other information such as the date of incorporation or address, as an already registered entity, additional information may be requested to verify that the new user is not the same as one previously registered. For example, if all information other than the addresses for two users is the same, both users will be asked to provide additional information to verify that they are two different users.

After the registration information is verified, the user will be able to use a website that provides the services associated with the aspects of the present invention. In one embodiment, the user may be able to temporarily access the website until the verification is complete. During this period, the user will have provisional status which may be indicated when other users interact with this user or view the information of this user. A user with the provisional status may have only limited access to the website. Additionally, after registration, if some information, for example address, of the user changes, aspects of the present invention may let the user to submit the new information for verification.

Aspects of the present invention, further, provide a search capability so a user may search the database on the computer for a full legal name or a partial name of an entity or a person associated with the entity to find out if a particular entity has a profile. Aspects of the present invention return all profiles belonging to users with the searched full legal name or partial name. Furthermore, aspects of the present invention may return profiles of the users whose names partially match the entered full legal name or partial name. For each exact or partial match, aspects of the present invention may return pictures with possibly other information about the user. In the case of an entity, the picture may belong to the president of the entity. An entity user may include pictures of entity officers and entity agents who conduct business with clients, such as market representatives, as part of the entity profile.

The user can look at the information returned by the system or service to decide which one of the returned profiles is associated with the intended entity. If the user finds the intended entity, the user can send an add request to the entity, along with the type of relationship between the user and the entity and the type of the job performed. Examples of types of business and professional relationships include: A is working for B, A is a parts supplier for B, or A is an independent contractor on a particular job for B. Examples of the type of job performed include: programming, chip design, web design, and interior design. The type of the job may be specified in more detail such as Java programming, C programming, digital chip design, analog chip design, and the like. Further information may be provided, for example, in the form of keywords. For example, for a digital chip design job, the following keywords may be provided: 32-bit processor, out of order execution, 10-level pipeline, 3 ALUs, 90 nm, multimedia, and the like, and for a web design job, the following keywords may be provided: MySQL, Ruby on Rails, scheduling meetings, international date and time support, and voting. In the context of business relationships, the particular jobs and tasks contribute significantly to the definition of the type of relationship. Thus, the relationship information can also be provided in the more detailed and particularized form of uploading design, picture, sound, video, computer program, or the like.

Note that a first user cannot see some of the information, such as the current and past job relationships, on the profile of a second user until the second user has given the first user permission to do so. For permission to be granted, the first user sends an add request to the second user and the second user accepts the add request or the second user sends an add request to the first user and the first user accepts it. The effect of an add request, once accepted, is that the two profiles are linked, thus add requests may also be referred to as link requests. Upon approval of the add request, the first user will be able to see all or some of the information on the profile of the second user. Similarly, the second user will be able to see all or some of the information on the profile of the first user.

The access that is permitted by the methods and systems of the present invention is usually reciprocal. Although, under certain circumstances, one user may be permitted access to more of the other user's information.

The relationship information that is available on each profile may include the profiles currently added and linked to the profile and their corresponding relationship with the profile, the past links to other profiles that have been since deleted, all pictures uploaded by the owner of the profile, date of creation of the profile, dates of all activities, time periods during which the profile was active, time periods during which the profile was inactive, the number of times the profile has been flagged or the number of users who believe some information on the profile is not correct. The names of the owners of other profiles which are added (linked) to a profile may be displayed or withheld if the profile owner or the entities who are linked, or were previously linked, to the profile so desire. In one embodiment, withholding the name of a linked entity may be permitted only if the relationship is no longer current. Alternatively, withholding the name of a linked entity will be allowed for non-current relationships only after some time has elapsed from the date that the link was established or severed. In one embodiment, the display of some of the entries on the profile may be withheld. When the owner of the profile is an entity, name of the entity, registration date, or the address of the main office are displayed to the person viewing the profile. Furthermore, for an entity, certain persons who are in decision making positions or are point persons for contacting the clients may also be shown in the profile. In one embodiment, for each person, who is associated with the entity, date of birth or a part of the date of birth, age or an approximation of the age, address or a part of the address, date of the last verification of the address, and other information that aid in uniquely identifying the person may be displayed to those viewing the entity profile.

For each professional relationship listed on the entity profile, the type of the relationship, and for each job performed within the context of that relationship, the type of the job and possibly some or all of the provided keywords may be displayed. In one embodiment, the information about current or past jobs which can be viewed may be limited based on the type of the relationship, the type of the job and the keywords for the jobs. Type of relationship would specify, for example, if the owner of the profile worked on a job or a job was performed for the owner. In one embodiment, the limitation may be based on, in addition to the above information, the information available on the profile of the viewer.

The following exemplary scenario describes how aspects of the present invention operate: Both Client A and Client B are working with a Provider C. They both ask Provider C to add (link) his profile to their respective profiles. They both make sure that the field describing the type of the relationship and the type of the job that C has performed for them and the corresponding keywords are correctly set. The linking enables each of A and B to see C's other performed jobs. As with the embodiment involving personal interactions, when C is a non-person entity, a false name or other false identifying information will be detected during the verification phase of the registration. If C tries to create two profiles under two different names and is planning to use one for linking to user A and the other one for linking to user B, this can be detected during the verification phase of the registration by the fraud protection mechanisms in place. Due to displaying of pictures, or other uniquely identifying information of C when C's name is searched, C cannot deny having a profile. If C uses fake information in his profile, any user whose profile is added to C's profile and who is privy to the accurate information regarding C may be permitted to flag the misrepresentative information. Even without the option of flagging, the user who sees C has used incorrect information will know that C is being dishonest.

In the above scenario, Client A and Client B can see some information about the jobs Provider C has done for them. If, based on the available information, Client A and Client B feel there is a similarity between the two jobs and hence Provider C has had the opportunity to violate the existing agreements, Client A may ask Client B to reveal more information, for example keywords, about the job done by Provider C for Client B. Client A may reciprocate by providing Client B with keywords related to the job performed for Client A, before or after contacting Client B. Client B can initiate the information exchange, as well. In one embodiment, both Clients A and B provide one another permission to access a limited amount of information, such as two or three keywords. The two clients may view the permitted keywords after receiving permission from one another.

In one embodiment, Clients A and B give the number of information tokens, for example keywords, they want to share and the system randomly or using heuristics selects tokens of information corresponding to each client and shows it to the other client. In one embodiment, the system decides about the number of tokens of the information to be exchanged and randomly or using a heuristic selects the tokens which will be shared. The above exchange can be continued until the clients decide to stop, for example, because they have concluded that the jobs are different or because they have concluded that the jobs are similar. In one embodiment, the clients may upload further information for exchange in order to reach a conclusion.

In one embodiment, aspects of the present invention use an algorithm to detect similarities between the information provided by the clients while the provided information by a client may or may not be visible by the other client. Similarity between the information provided by two different clients may include a similarity between the keywords or a similarity between uploaded pictures or drawings depicting identifying aspects of the jobs. This aspect may be used to warn the two users that they may share an uncomfortably overlapping relationship. The warning can prompt the users to engage in an exchange of information using the service or to contact each other for further investigation of the overlapping link. This is in some ways similar to the matchmaking function provided by the system except that it is intended to warn two users that they may be too close in areas where they wish to stay apart. A user may place a special request for receiving a warning regarding matches found to one of its jobs that the user considers sensitive.

In one aspect, the users are provided with the option of setting their relationship status without linking. All activities are still added to the history of the person.

In one aspect, in addition to sending a request to link to a person, a user can send a "change request" to change his relationship with a person he is already linked to. For example, when two people are dating and are linked, their relationship would be "dating." Later, they get engaged, and one of them sends a request to the other to change the relationship to "engaged."

In one aspect, when ending a relationship, the user can select the reason for ending such as breakup, divorce, being widowed, and the like.

Aspects of the present invention provide a method for exchange of information between two registered users of an on-line networking system. The system has a database for storing input data, an input and output interface for receiving the input data and displaying output results, a processor for controlling the database, processing the input data and generating the output results, and a transceiver for establishing communication with a network through which the input data and the output results may be transmitted or received. The method includes registering at least two prospective users of the system as the registered users after receiving registration information from each of the prospective users and verifying the registration information of each user, establishing a profile for each registered user, the profile including identification information of the registered user, linking a first profile, belonging to a first registered user, to a second profile, belonging to a second registered user, responsive to a link request from the first registered user and an acceptance of the link request by the second registered user, the link request including relationship information of the first registered user with respect to the second registered user and the acceptance confirming the relationship information by the second user, the acceptance of the link request converting the first registered user and the second registered user into linked users, and allowing the linked users access to the profiles of one another.

Aspects of the present invention provide a method for increasing trust in a relationship by providing transparency regarding past and present relationships. The method is implemented on a system having a database for storing input data, an input and output interface for receiving the input data and displaying output results, a processor for controlling the database, processing the input data and generating the output results, and a transceiver for establishing communication with a network through which the input data and the output results may be transmitted or received. The method includes receiving registration information from prospective users of the system, verifying the registration information for authenticity to obtain verified registration information, registering the prospective users as registered users by establishing a profile for each registered user, linking a first profile to a second profile responsive to a link request from a first registered user having the first profile and an acceptance of the link request by a second registered user having the second profile, and allowing the first registered user and the second registered user to view the second profile and the first profile, respectively. The link request includes relationship information of the first registered user with respect to the second registered user and the acceptance confirms the relationship information by the second user. The profile of each registered user includes the verified registration information and the relationship information of the registered user. The registration information includes legal name and one or more pictures of the prospective user or an agent of the prospective user when the prospective user is an entity. Further, each registered user is permitted no more than a single profile, and the profile may not be erased once it has been established and a modification of the profile is recorded in the profile.

In one aspect, the relationship information for each registered user includes either a solitary status of the registered user or an indication of existence of a relationship between the registered user and at least one other registered user, a characterization of a type of the relationship, name of the other registered user, and any subsequent modification to the type of relationship including a ceasing of the relationship.

In one aspect, the method also includes linking the profile of first registered user to a third profile of a third registered user, and receiving an indication from the second registered user that the relationship information of the first profile indicates non-exclusivity of a relationship that is intended to have an exclusive nature.

In one aspect, the method also includes receiving a delete request from the first registered user for deleting the second registered user, severing a link between the first profile and the second profile, the link having been generated responsive to the linking of the first profile to the second profile, updating the relationship information in the first profile and the second profile to indicate the severing of the link, maintaining a history and data regarding the link in the relationship information in the first profile and the second profile, and preventing the first registered user and the second registered user from viewing the second profile and the first profile, respectively, after the severing of the link.

In one aspect, the method also includes receiving a flagging of the first profile by the second registered user, the flagging being an indication that one or more items of information in the first profile are disputed by the second registered user, providing the first user notice and opportunity to respond by modifying disputed items of information on the first profile or by providing evidence in support of the disputed items of information, removing the disputed items of information if no convincing response is received from the first user or from another registered user within a grace period, and including and maintaining a notation of the flagging in the first profile.

In one aspect, the method also includes receiving a search request from the first registered user asking a search for a searched person or searched entity to be conducted within the database, the search request being prior to or contemporaneous with the receiving of the link request from the first registered user, and conducting the search according to identification information provided by the first registered user. The searched person or the searched entity belongs to a category selected from the registered users, the prospective users, and non-users.

In one aspect, the identification information includes a name or a partial name of the searched person or the searched entity and the method further includes disregarding the search request if the identification information is a generic criterion capable of being applicable to a group of persons or entities irrespective of their legal name.

In one aspect, the identification information includes a picture of the searched person or a picture of an associate of the searched entity.

In one aspect, the registered user is a person, and the type of the relationship is selected from husband-wife, husband in committed monogamous relationship-wife in committed monogamous relationship, husband in open marriage-wife in open marriage, fiancé-fiancé, date-date, friend-friend, or a relationship defined by mutual agreement of both registered users.

In one aspect, the registered user is an entity, the agent is a principal, an officer, or a market representative of the entity, the type of the relationship is selected from service provider-client, seller-buyer, vendor-vendee, principal-contractor, employer-employee, grant writer-granting entity, or a relationship defined by an agreement, and the relationship information includes keywords indicating a type of job performed or to be performed, and the relationship information further includes a nature of the agreement between the linked users.

In one aspect, either or both of the following are implemented: a name of the second registered user within the relationship information of the first registered user is blocked from being viewed by other registered users having profiles linked to the first profile, and a name of the first registered user within the relationship information of the second registered user is blocked from being viewed by other registered users having profiles linked to the second profile. The relationship information includes information regarding current and past relationships.

In one aspect, the method also includes calculating a credit score for measuring a degree of reliability associated with the profile of each registered user, and including the credit score in the profile. The credit score is determined as a function of length of existence of the profile, duration of active status and periods of inactivation of the profile, degree of transparency of the profile, transparency reducing as more names or events are blocked within the profile, and degree of verified flagging of the profile. The credit score is selected from a group consisting or a numerical value and a non-numerical value including Very Good, Good, Bad, and Very Bad.

In one aspect, the method also includes generating a code responsive to a request by the registered user, sending the code to a recipient, the recipient being another registered user or a prospective user, and providing a gradual, time-limited, or selective exposure of the profile of the registered user to the recipient upon activation of the code by the recipient.

In one aspect, the method also includes assigning an inactive status to the first profile, and preventing access to the first profile from all registered users and prospective users. The inactive status is assigned responsive to nonpayment of subscription fees or upon request by the first registered user. The administrator may also assign an inactive status.

In one aspect, the method also includes receiving limited registration information from a prospective user applying for a limited account, verifying the limited registration information for authenticity, registering the prospective user as a limited access registered user, and granting the limited access registered user permission to view a subset of information in the profiles of the registered users. The limited registration information is selected from a group consisting of less demanding amount of information than the registration information, more demanding amount of information than the registration information, and equally demanding amount of information as the registration information.

In one aspect, the method also includes receiving the registration information from two prospective users applying for joint accounts, verifying the registration information, registering the two prospective users as joint users having joint profiles, and displaying an indication of the joint profile responsive to a search request for either of the joint users. The joint users may opt for a single joint account and a single joint profile as well.

Aspects of the present invention provide a system for moderating voluntarily established transparency in relationships. The system includes a communication network for receiving updated authentic public records from one or both of government agencies and reliable private agencies, an input interface for receiving registration information from prospective users of the system and for receiving link requests, a database for storing the registration information, a processor for verifying authenticity of the registration information against the public records to obtain verified registration information, registering the prospective users as registered users by establishing a profile for each registered user, the profile including some or all of the verified registration information, and linking a first profile to a second profile, the first profile associated with a first registered user sending a link request and the second profile associated with a second registered user consenting to establishment of a link pursuant to the link request, the link request specifying relationship information between the first user and the second user, the relationship information being added to the first profile and the second profile responsive to the linking, and an output interface for displaying information in linked profiles to the registered users associated with the linked profiles. The verified registration information includes legal name and one or more pictures of the registered user or of an agent of the registered user when the registered user is an entity and each registered user is associated with no more than a single profile. The profile may not be erased once it has been established and information items within the profile remain in the profile with modifications of the information items further added to the profile.

In one aspect, the system also includes an interface for receiving a delete request from the first registered user for deleting the second registered user or receiving a delete request from the second registered user for deleting the first registered user. A user deletes another user when he discontinues the link between the two users. Here, responsive to the delete request, the processor: severs the link between the first profile and the second profile, includes severance information in the relationship information of the first profile and the second profile, and prevents each of the registered users associated with a severed link to view the profile of the other registered user associated with the severed link. In one aspect, even for a limited time after severing the link, users can still see each other's profile.

In one aspect, the input interface receives a flagging of a potentially misrepresentative profile by one of the registered users permitted to view the potentially misrepresentative profile and disputing one or more items of information in the potentially misrepresentative profile. The processor: generates a notice to be delivered to the registered user associated with the potentially misrepresentative profile by the output interface, removes disputed items of information if no correction or convincing response is received within a grace period, and includes a notation of the flagging in the potentially misrepresentative profile.

In one aspect, the relationship information for each registered user includes an indication of existence of a relationship between the registered user and at least one other registered user, a characterization of a type of the relationship, name of the other registered user, and dates of inception and termination of the relationship, and when the registered users are entities, the relationship information further includes keywords indicating a nature of jobs performed within the scope of the relationship.

Aspects of the present invention provide a method for gradual exchange of information between two registered users of a system. The system has a database for storing input data, an input and output interface for receiving the input data and displaying output results, a processor for controlling the database, processing the input data and generating the output results, and a transceiver for establishing communication with a network through which the input data and the output results may be transmitted or received. The method includes registering at least two prospective users of the system as the registered users after receiving registration information from each of the prospective users and verifying the registration information of each user, establishing a profile for each registered user, each profile including keywords of one or more professional undertakings corresponding to one or more providers or clients of the registered user, detecting common keywords between the profiles of two or more of the registered users being overlapping registered users, providing a predetermined number of the common keywords to the overlapping registered users, and providing additional ones of the common keywords to the overlapping registered users. The predetermined number is selected by the system, by one or more of the overlapping registered users, or by consensus of all of the overlapping registered users. The additional ones of the common keywords are either provided to the overlapping registered users responsive to request and consensus by the overlapping registered users, or provided according to a gradually increasing pattern established by the system. The provision of either the predetermined number of the common keywords or the additional ones of the common keywords is terminable by any of the overlapping registered users. The providers or clients are among the registered users of the system and each of the providers or clients is privy to and in agreement with the keywords corresponding to a proposal, product, or service provided by a provider or client to the registered user, and a professional undertaking includes a contract or a proposal for a task or a service. Typically, when two users have common keywords they are overlapping, whether or not they know one another. For example, A may perform a job for B and give the job to his friend, A', to provide it to C. If A' and C are on the system, and their keywords are correctly set, then A', C, B, and A will all overlap.

BRIEF DESCRIPTION OF THE DRAWINGS

FIG. 5 shows one exemplary presentation of matched entries that result from the search stage of FIG. 4, according to aspects of the present invention.

FIG. 7 shows one example of the information regarding a user that is presented to other users who are linked to this user, according to aspects of the present invention.

DETAILED DESCRIPTION OF THE INVENTION

Figure 1:
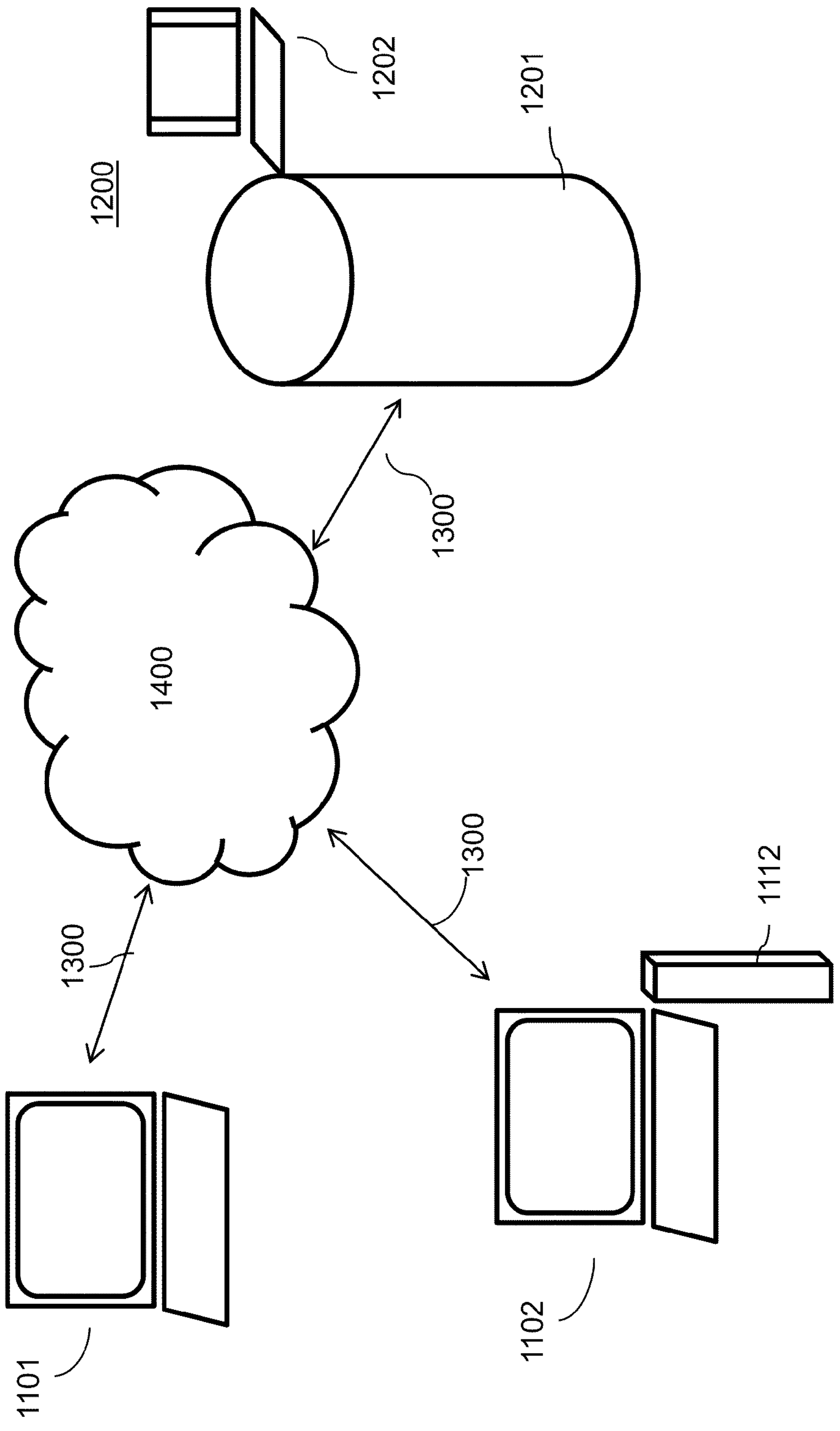
FIG. 1 shows a schematic drawing of a system, according to aspects of the present invention.

In the portion of the detailed description that follows, the term "user" would typically refer to a registered user of the methods and systems of the present invention. However, depending on context, the term may also refer to a "prospective user" or a "non-user" who is not registered with a website or another moderating center that administers the service provided by the methods, devices, and systems of the present invention.

In one aspects of the present invention, the methods of the invention are presented to a user through an online service that may be accessed via a website. Hardware located at a central or distributed location where an administrator, or a moderator, controls the processes of the present invention embody or include devices and systems of the present invention. Some aspects of the present invention may be embodied in the devices and systems utilized by a user.

Aspects of the present invention provide methods, devices, and systems for sharing the type of information that engenders and establishes trust among individuals or business entities that are engaged in a networked relationship. Aspects of the present invention permit voluntary transparency among users who wish to make their past and present personal or professional relationships transparent to one another in order to engender trust.

While the aspects of the present invention require the use of one or more of computer terminals, computers, databases, servers, workstations, and communication networks, the networking that is facilitated, and at times authenticated, by the aspects of the present invention may be of various types and for various purposes. For example, the type of networking may be online networking or in-person networking that is accomplished without the interference and aid of a computer or the internet. Further, the purpose of the networking may be dating, professional networking, or establishing other social or business oriented relationships. The aspects of the present invention utilize machines and machine-implemented methods to increase the degree of trust associated with the networking, whether or not the networking itself began on a computer using an online meeting and networking service, over the telephone following an introduction by a mutual contact, or as a result of a personal one-to-one meeting at a party or professional gathering.

Many relationships obtain their value from numbers. Social media websites are designed around the idea of having many friends and sharing those friends. In professional networking, most professionals would prefer being linked to a person who has many contacts such that they too may benefit from those additional contacts.

On the other hand, some relationships obtain worth from their exclusivity. Such relationships are valued not just by whom they include but also by whom or what they exclude. Romantic relationships in most cultures are valued for their exclusivity and marriage contracts are often illegal if they are found not be exclusive. Many business relationships, particularly those involving adversarial competition, derive their value from excluding the competitor from a circle of cooperators. Therefore, it would be desirable for a party to a relationship to verify and ascertain that the other party is not engaged in a relationship of the same type with anyone else or at least with an undesirable adversary. However, it is not as easy to verify that the girl who is holding herself out as the fiancée is not already married to another man or dating several other men, nor is it easy to verify that the lawyer who owes a duty of loyalty and confidentiality is not helping the client's adversary or at least another objectionable client at the same time. In both of these two examples, the first party, whether he is a bachelor or a businessman, relies on the integrity or professionalism of the second party such as the fiancée or the lawyer. While, the option exists for severing the relationship and at times even demanding damages, generally a lie gets halfway around the world before the truth has a chance to get its pants on.

Aspects of the present invention may be utilized in above or similar circumstances to provide a degree of confidence for a first party about the absence of an undesirable relationship with respect to a second party and vice versa. Some aspects of the present invention provide continuous monitoring and policing that are helpful in such situations. The monitoring is, however, voluntarily established and is not of a clandestine type that could damage the relationship.

One common attribute of most relationships is that while it is not difficult to verify or prove that a relationship between two or more parties exists, it is not easy to verify or prove that no party exists that has a relationship of certain type with a given party. For example, if a first party is engaged in a relationship of a first type with a second party, there are certain facts that are readily available to the first party: 1) the first party knows that he is engaged in the relationship of the first type with the second party; and 2) the first party can ask the second party to admit to or announce that the second party is in fact engaged in the relationship of the first type with the first party. In the context of personal romantic relationships, a bachelor (1) knows who his fiancée is and (2) can ask his fiancée to declare or announce that she is indeed his fiancée. In the context of professional relationships, a customer or a client (1) knows who his vendors or service providers are and (2) may require that his vendor or service provider to prepare a writing that indicates the vendor or the service provider is patronizing him. Aspects of the present invention obtain these two readily available pieces of information from a first and a second party to a relationship in order to shed light on potentially undesirable relationships of either party with a third party in the past or present or during the time that the undesirable relationships is in effect.

Aspects of the present invention are described below with respect to a dating relationship. As explained above, these features may be applied to other types of relationship where transparency and trust are of value and a third wheel poses a danger and when snooping around without the knowledge of an honest partner may lose you the honest partner or is impractical time-wise and money-wise.

The exemplary implementation that is presented below, describes a website providing a service for checking the marital or dating status of its users. The target users may include married couples or dating adults. Use of the website allows a user to demonstrate his faithfulness to his significant other such as a spouse, a girlfriend, or even a first date. Use of the website also allows the user to demand the same level of transparency from the significant other. As such, the website provides the user with an advantage in the online or offline dating markets by permitting him to screen out dishonest potential dates. The service provided by the website can save its users time, money and emotional energy by reducing the number of dates that would lead to heartbreak.

FIG. 1 shows a schematic drawing of a system for establishing transparency in relationships, according to aspects of the present invention.

The system includes user terminals 1101, 1102 and a moderator station 1200 which are each communicating through connections 1300 with a commonly used network 1400. The user terminals 1101, 1102 include input and output interfaces and may or may not include processing and storage hardware 1112. The moderator station 1200 includes input and output terminals to be used by the moderator or the system administrator and storage and processing hardware 1201. The connections 1300 may be wired or wireless. The commonly used network 1400 may be the internet or another type of wide area network. The network 1400 may even be a local area network if the system is to be used by a limited group of users that are members of the local area network.

In one aspect of the present invention, the system includes only the moderator or administrator station 1200. In one aspect, user terminals and the moderator station 1200 together form the system.

Figure 2A:
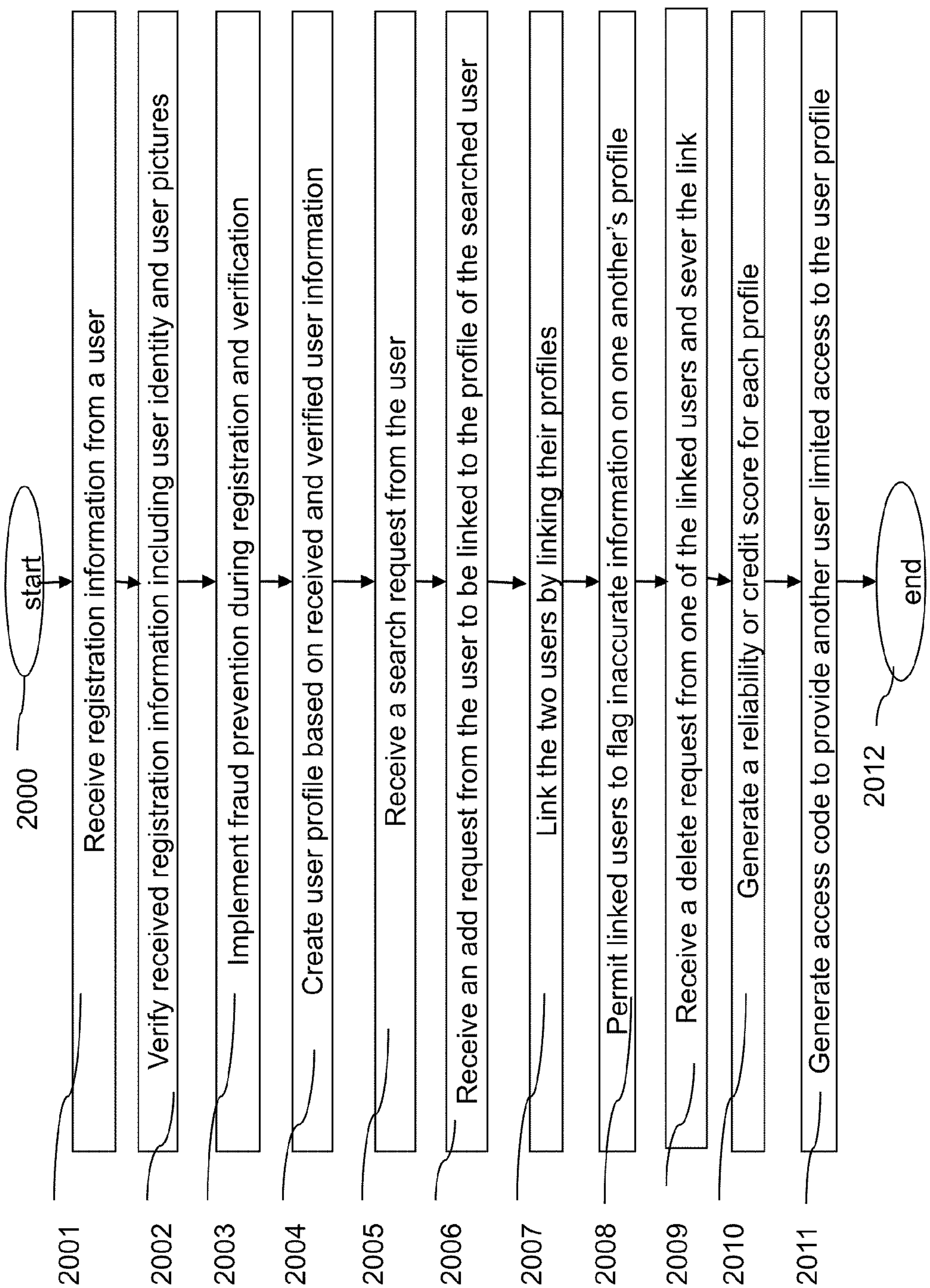
FIG. 2A shows a flowchart of an exemplary method, according to aspects of the present invention.

FIG. 2A shows a flowchart of an exemplary method for establishing transparency in relationships, according to aspects of the present invention.

A method according to the aspects of the present invention and adapted for being implemented by using the computer systems and databases of the present invention is described below. The method shown in FIG. 2 may be implemented using the system of FIG. 1 or a comparable system that utilizes machines for accurate, speedy, and long term recording, storing, and processing of the data input by the users.

The method begins at 2000 and continues with stages of registration 2001, verification 2002, fraud prevention 2003, creation of a profile 2004, search 2005, adding 2006, linking profiles 2007, flagging 2008, deleting 2009, score generation 2010, and code generation 2011. The method ends at 2012. Some of these stages may not be independent of other stages. For example, fraud prevention may be a part of verification and linking of the profiles occurs when adding succeeds. Not all of the above stages are required to be used for every user. For example, not all users would generate a code or engage in flagging. Moreover, the order of the stages may vary depending on the use.

The method begins at 2000.

At 2001, a prospective user is prompted to enter his registration information.

In most cases, a prospective user must register to use the service. The registration is done by receiving some information about the user. The information required may include the full legal name, relationship status (married, divorced, separated, engaged, single not dating, single dating, etc.), and pictures of the user. Other information, such as date of birth, height, weight, and education may also be obtained from the user. Alternatively, the user may provide the type of information with a particular other user only when the user sends a specific link request to this other user.

At 2002, the registration information that is provided by the prospective user is verified.

The two stages or registration and verification are performed in an intertwined and iterative manner to allow the prospective user to correct any information that is disputed by the verification stage and thus continue with his registration.

A verification step is used to verify one or more pieces of the said information. For example, the user may be asked to enter his driver's license information so the legal name can be verified against a government database. In one embodiment, the user may be asked to print a form, fill the form with his full legal name and other information, notarize the form and send it to the service administrator. The notarized form is used to verify that the name and other information entered during the registration are correct. In one embodiment, the information submitted may be verified against the information existing in a database. For example, the user may provide his full legal name, home address and date of birth. This information may be verified against the information existing in another reliable and credible database. In one embodiment, for verifying the address of the person, a letter may be sent to the address provided by the person and the person will be asked to login to a website and enter the random code written on the letter to the website to complete the registration. In one embodiment, the carrier delivering the letter may be required to check the identification card of the person receiving the letter to make sure that the name printed on the letter exactly matches the name on the identification card.

In one embodiment, social security number, passport number, or another number which provides a means of uniquely identifying a person and verifying name or other pieces of information of the person may be used during the verification phase. Marriage license of a user may be used to verify the user's marriage status. Divorce documents may be used to verify the user's relationship status.

The verification step may also involve ensuring the uploaded pictures are clear and satisfy some requirements. For example, the pictures are examined to ensure that the person's face is clearly visible and that all of the provided pictures belong to the same person. This may be achieved by visually inspecting the pictures or using a face recognition and comparison algorithm. The pictures may also be compared against a driver's license picture or passport picture for verification. If a user sends fake pictures for his profile, the system discovers the misrepresentation if it verifies the pictures. Fake pictures that escape verification may be discovered and flagged by other users who are linked to the user and have seen him in person.

At 2003, the method implements fraud prevention in conjunction with registration and verification.

Fraud prevention may be, independent of verification and registration, performed iteratively with registration and verification, or an integral part of registration or verification. Detection of fraud prevents registration from being completed. Therefore, upon detection of fraud indicators, the prospective user is presented with an opportunity to clarify ambiguities or misperceptions.

Aspects of the present invention prevent a user from creating more than one profile under his name. If a prospective user or an entity has the name and other information such as date of birth of an already registered user, additional information may be asked to verify that the new user is not the same as the existing registered user. For example, if all information other than the address information for two users is the same, both users will be asked to provide additional information to verify they are indeed two different users.

During registration, verification, and fraud prevention one or more of the abovementioned techniques will be used to verify the information provided by the user. After the information is verified, the user will be able to use the website that provides the service. In one embodiment, the user may be able to temporarily access the website until the service completes the verification step. During this period, the user will have a provisional status and his status may be indicated on his profile when other users interact with this user or view the information of this user. In one embodiment, a user with provisional status may have limited access to the website.

Additionally, after registration, if some types of information, such as the address of the user changes, the service may permit the user to submit the new information for verification. Some other types of information, for example the date of birth, are not subject to being changed unless an error had occurred in the first place.

At 2004, a profile is created for the registered user.

The profile includes the information provided by the user during registration and verified by the system. The profile may also include other information that has come to light during the verification and fraud prevention stages. Once created, a profile may not be deleted and entries in a profile are cumulative in the sense that any modification of an item of information is noted along the previously entered and since modified item.

An activity or event occurs when a user sends a request to another user for adding this other user or when the other user accepts or rejects the add request. An entry is added to the list of activities related to the user for each action taken. For example, if Jack sends an add request to Mary and Mary accepts it, two entries are added to the profile of each of them for this interaction. For Jack, the two entries are sending of the add request and the acceptance by Mary. For Mary, the two requests are the receiving of the add request and the acceptance by her. If Jack deletes Mary at a later time, then one additional entry is added to the profile of each of them corresponding to the deletion event or activity. If George is linked to Mary, he can go through the list of activities to find out whether Mary had been in a relationship with Jack.

Alternatively, in some embodiments, the profile may be deleted and the user is allowed to hide some activities in the history if these activities are related to past relationships, a certain amount of time has passed since they were added, or similar criteria.

At 2005, a search capability is provided to the registered user.

The service provides a search capability so a user may search the database to find out if another user has a profile in a database controlled by the service. The search may be done for a full legal name or a partial name or even a photograph. In some aspects, the method and system may allow searches according to a category, such as singles between 30 and 40 years in age. However, in other aspects of the present invention, searches for generic identifiers such as an age group may be disallowed.

The service returns all profiles belonging to users who match the search string and have the full legal name or partial name searched for. Furthermore, the service may return profiles of the users whose names partially match that said full legal name or that said partial name. A search capability using a picture of the person being searched may also be provided. The user may input a picture he has taken of the person he is searching to the system to see if the person of interest to him is within the database of the service.

For each exact or partial match, the service returns the pictures of the matching user with possibly other information such as the date the profile has been created. Even when the first user searches the system by using a name, pictures of matching second users are returned to allow the first user to confirm that he has indeed located the intended second user.

At 2006, the system permits the user to send an add request to the person that he searched and found on the system.

The user can look at the pictures to decide which one of the returned profiles belongs to the intended person. If the user finds the intended person, the user can send an add request, namely a request to link the two profiles, to the intended person. If the person being searched is in a relationship with the adding user, the adding user sends the type of the relationship along with the add request. For example, a first user sends a request to a second user asking the second user to be linked to his profile as his spouse, fiancé, or girlfriend, and the like.

At 2007, the system links the profiles of the two users.

Upon approval of the add request, the first user will be able to see all or some of the information on the profile of the second user. The information may include the name of the owner of the current and past profiles linked to the second user's profile and their corresponding relationship information, any changes in the relationship information, the name of the owner of the past linked profiles since deleted from the second user's profile, all pictures uploaded by the owner of the profile, the dates of all activities performed by the owner of the profile, the date of the profile creation, the time periods during which the profile was active, the time periods during which the profile was inactive, and the number of times the profile has been flagged. A profile may be inactivated for various reasons including because the membership fee was not paid. A profile, or an information item within the profile, is flagged when another user disputes the accuracy of the item of information on the profile. The names of the owners of the profiles which were added and linked to a profile may be displayed or they may be withheld if the owner of the profile or the persons who were linked to this profile desire that the names be withheld. In one embodiment, withholding a name will be allowed only for non-current relationships or only after certain period has elapsed from the date the profiles were severed. In one embodiment, the display of some of the entries on the profile may be withheld. In one embodiment, withholding the display of an entry will be allowed if it corresponds to a non-current relationship or after certain period has elapsed from the date the entry was added. Furthermore, one or more of the date of birth, part of the date of birth, age or an approximation of the age, address of the person, part of the address of the person (e.g., country, state, province, city, and/or zip code), the date of the last verification of the address or other information may be displayed to the person viewing the profile.

As the first user, who requested the add, is allowed to view the profile of the second user, who accepted to be linked to the first user, the second user too will be able to see all or some of the information on the profile of the first user. The viewing rights are reciprocal in some embodiments. Note that a first user cannot see some of the information, such as the current and past relationships of the user, on the profile of a second user until the second user has given the first user permission. To give permission, the second user has to have accepted the add request. Whether the first user or the second user sends the add request, once the recipient user accepts the add request, the profiles are linked and the viewing rights are usually reciprocal.

The following exemplary scenario helps further describe the process: Users A and B are both romantically involved with a user C and they ask user C to add them, such that his profile is linked to their profiles. They, further, make sure that the field describing their relationship with C is correctly set to married, engaged, or another type of romantic relationship. Being linked to C, enables each of the two users A and B to see C's other romantic involvement. Moreover, when C's name is searched, the pictures of C will be displayed; thus, C cannot deny having a profile or claim that he is someone other than the C that is linked to the other party. If C tries to create two profiles under two different names to use one for linking to user A and the other one for linking to user B, this too can be detected during the verification step of the registration.

At 2008, each of the linked users is permitted to flag the inaccurate information on the profile of other users that are linked to him. This feature is one of the optional features. There are other means of evaluating the reliability and truthfulness of the entries in lieu of flagging.

The system may also provide the capability for a first user to flag the profile of a second user if there is more than one profile under the second user's name, if the second user has not used his real pictures, or if any of the information on the second user's profile is not correct.

Upon receiving a predetermined number of such flags for the profile of a user, the system administrator may, for example, inactivate the user's profile, ask the owner of the profile to upload his real pictures or correct the flagged information, or inform any user who views all or some of the information corresponding to the profile about the fact the profile has been flagged one or more times by other users. The system administrator may also permit the owner of the profile to dispute the flagging by providing evidence in support of the accuracy of the information on his profile.

At 2009, a delete request is received from one of the users indicating his desire to sever his link with another user.

A first user may choose to delete a second user who is linked to the first user's profile. Upon deletion, an entry describing this event is added to the profile of both first and second users. Furthermore, the first user will no longer be able to see the information of the profile of the second user and vice versa.

At 2010, a credit score is generated.

Aspects of the present invention may calculate a numerical score for a first user to provide a means for other users to gauge the value of the information on the first user's profile without viewing the profile.

The score may be a function of one or more of the length of time the first user has been a member, the length of time the first user's profile has been active, the number or the percentage of the names on the first user's profile which have been withheld, the number or the percentage of the entries on the first user's profile which have been withheld, and the number of times the profile of the user has been flagged by other users. The higher the length of the membership and the length of the time during which the profile has been active, the higher the score. The higher the number of blocked names and the number of times the profile is flagged, the lower the score.

Thus, the reliability or credit score for each user generally rewards the duration of membership, the transparency of the profile, and unchallenged quality of the information in the profile of the user.

In one embodiment, instead of calculating and providing a numerical score, a non-numerical score may be computed and provided. The non-numerical score may for example use four values of Very Good, Good, Bad, Very Bad.

The aspects of the present invention may display the above score in all or some of the places the information corresponding to a user is displayed.

At 2011, an access code is generated.

A code can be generated at the request of a first user who wishes to share some of his information, or brag about his reliability, without divulging his identity. The first user can send the code to a second user in order to allow the second user to access the score of the first user. The second user can use the code to retrieve some information corresponding to the first user. The information may include pictures, the dates the pictures were uploaded, the credit score, the active or inactive status of the profile, the number of profiles linked to the profile of the user, and the types of the relationships corresponding to the profiles linked to the profile of the user. A text provided by the user generating the code may be displayed upon receiving and using the code. The text is used to assure the recipient of the code that the code is generated by the same person who is sending the code to the recipient. This can be achieved by, for example, writing the email address which will be used to send the code to the recipient in the text or writing the unique ID of the person in another website in the text. This way, A cannot receive a code that has been sent to him by B, turn around and send the code to C, and pretend he is B. In addition to or in lieu of the confirmatory text, one or more of the date of birth, part of the date of birth, age or an approximation of the age, address of the person, part of the address of the person (e.g., country, state, province, city, and/or zip code), the date of the last verification of the address or other information may be displayed to the person who is using the code.

By using the code, the second user not only obtains access to the information of the first user but also permits the first user to see her information. Thus, upon using the abovementioned code by the second user, some or all of the information corresponding to the second user, will become visible by the first user. In one embodiment, the information of the second user may be sent by electronic mail, text message, voice or any other means to the first user.

The code that is generated may be a random code. The code may expire after certain number of usages, after a predetermined time has elapsed from activation or after a predetermined time has elapsed from its first usage. In one embodiment, the information of the first user may be continuously visible to the second user and vice versa until the code expires.

In one embodiment, a URL link may be generated and used instead of a code.

In one embodiment, the person receiving the code or the link may be able to access the information even if the person is not a registered user.

This exchange of information enables the second user to verify the membership and the score of the first user without knowing the name of the first user. This feature can be used for example, in an online dating website, where two users have not revealed their names to each other due to privacy concerns, but each person would like to make sure the other person has a profile and possibly access some of the profile's information before introducing himself and investing more time into knowing the other person.

The method ends at 2012.

Figure 2B:
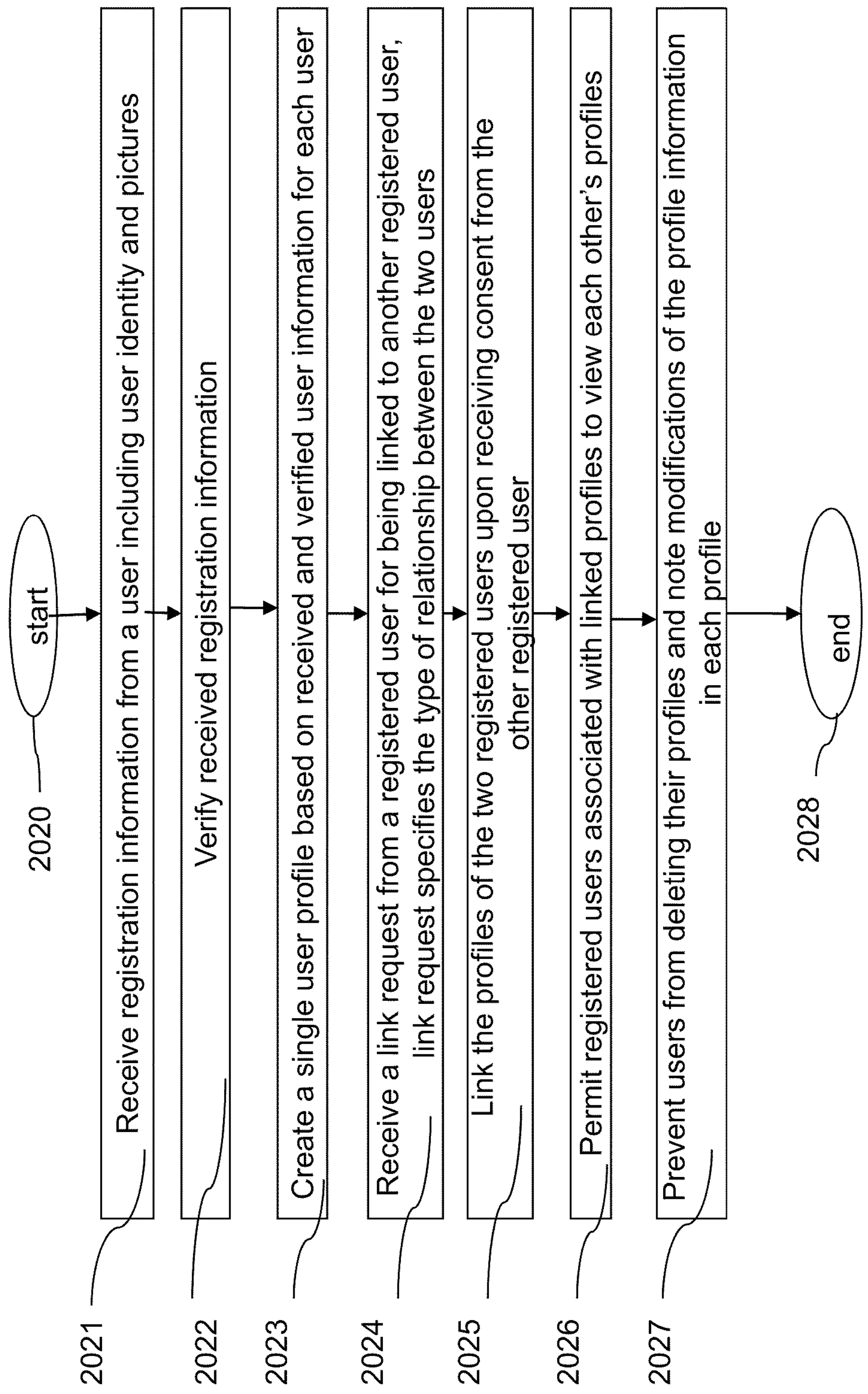
FIG. 2B shows a flowchart of an abbreviated exemplary method, according to aspects of the present invention.

FIG. 2B shows a flowchart of an abbreviated exemplary method for establishing transparency in relationships, according to aspects of the present invention.

At 2020, the method begins.

At 2021, registration information including user identity and pictures is received from a user.

At 2022, the received registration information is verified.

At 2023, a single user profile is created for each user that is based on received and verified user information.

At 2024, a link request is received from a registered user for being linked to another registered user. The link request specifies the type of relationship between the two users.

At 2025, the profiles of the two registered users are linked upon receiving consent from the other registered user.

At 2026, the registered users associated with linked profiles are allowed to view each other's profiles. The profile of each user is transparent to the other users that are linked to him. The transparency may be reciprocal or lop-sided according to an agreement by the users. The degree of transparency may be varied by the users and the system administrator.

At 2027, modifications of profile information are noted in the profile and the profile may not be deleted once it has been established. Severing the link prevents other users to view a profile. Further, a profile may be inactivated. However, it may not be deleted.

In an alternative aspect of the present invention, the user is permitted to delete his profile altogether. In this aspect, the user has to go through the registration process again if he wishes to re-establish a profile at a later time. Moreover, any credit score attributed to his previous profile is reset and he would have to begin establishing credit anew.

Short of deleting an entire profile, in one aspect of the present invention that is described above, a user may make some of its activities invisible. Certain criteria are used for determining which activities are permitted to become invisible. For example, only past relationships, or only past relationships that have been subject to passage of considerable time may be hidden from currently linked users.

At 2028, the method ends.

Limited Accounts

The aspects of the present invention may permit a user to register just to access a subset of the functionalities provided by the service. For example, a limited account holder may be permitted to search only to see if a specific person has a profile.

Joint Accounts

A joint account type of membership may also be provided, which can be used by two persons who are already in a relationship. The joint account may for example be started by one of the persons and an invitation may be sent to the other person. The joint account may have some preset information such as the relationship type. Both persons will go through verification steps to verify their information. A joint account holder may have access to a subset of the functionalities of the service. Furthermore, searching a person who is a joint account holder may return the names of both holders of the joint account.

Figure 3:
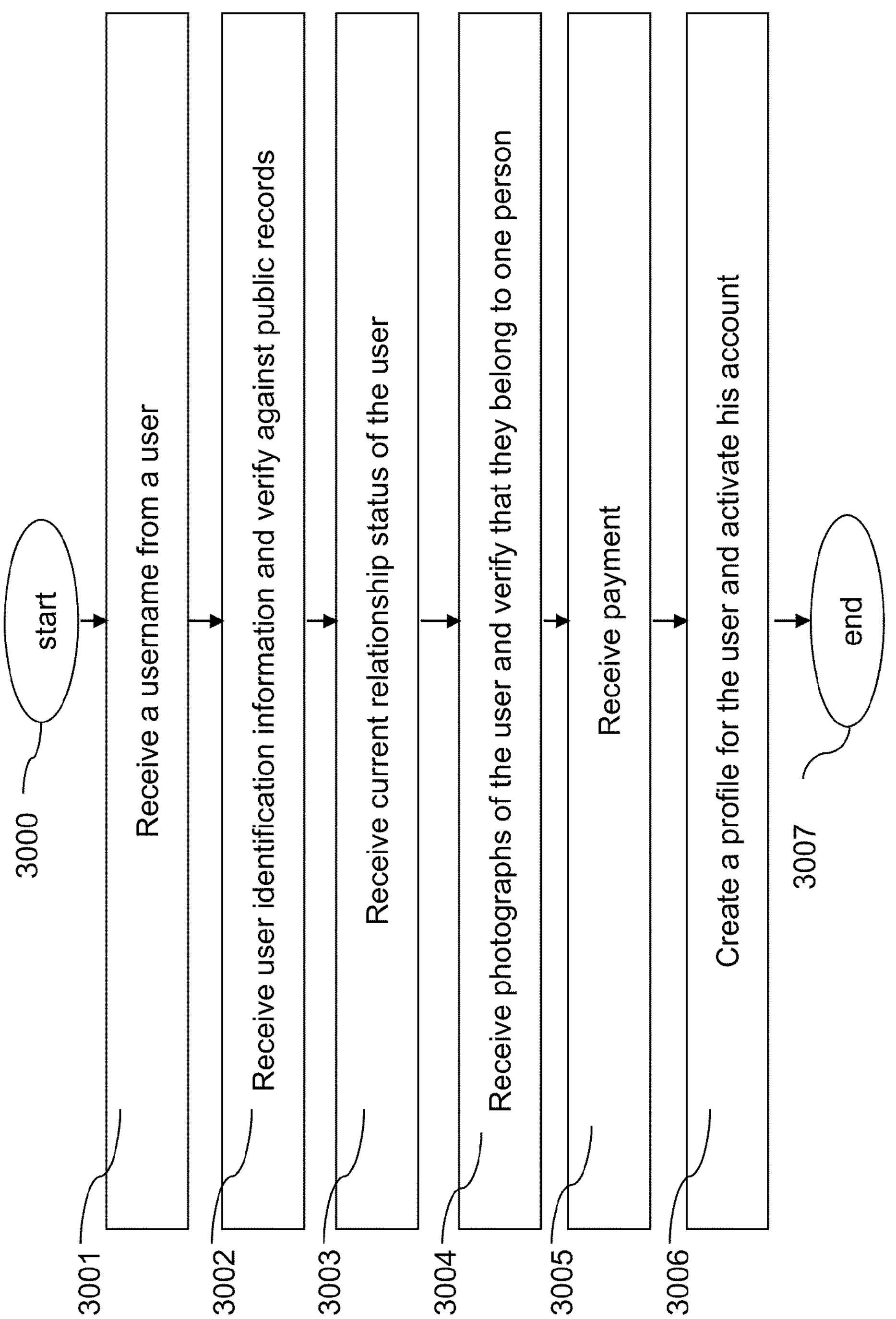
FIG. 3 shows a flowchart of an exemplary method for registration, according to aspects of the present invention.

FIG. 3 shows a flowchart of an exemplary method for registration, according to aspects of the present invention.

The method begins at 3000.

At 3001, a user is prompted to choose a username.

At 3002, the user is asked to input identification information. The identification information may be the user's driver's license number or another form of identification that is verifiable by referring to public documents. In some embodiments, a signed and notarized document which provides full legal name of the user may be accepted as identification information. The validity of the notarization is verified by the system and the system ensures that the notarized signature and the name asserted in the declaration are the same. Otherwise, the content of a declaration by the user is not verifiable against public records. However, lying on the declaration under the penalty of perjury imposes legal liability.

At 3003, the user is prompted to input his marital or relationship status, such as married, divorced, separated, engaged, widowed, single dating, or single not dating and a few of his recent pictures.

In one aspect of the present invention, a user need not specify his overall relationship status at the time he registers with the service. Rather, at the time that a link request is sent by him, he specifies the type of relationship with the person from whom the link requested.

If the service and the system are used in the context of professional relationships, this stage is modified to include particular types of business relationship. For example, in the context of a vendor/vendee relationship, a customer may have to specify whether he has one or more existing vendors that provide a particular component to his company. In the context of service providers, a service provider may have to specify whether he is already providing a certain type of service to certain types of clients in certain geographic areas. Alternatively, the user may be required to enter all of his former and current clients. For example, an attorney is frequently required to provide the names of all of his former and current clients for purposes of conducting a conflict check. As explained above, in certain competitive business relationships, only particular competitors cause concern for a prospective client. Thus, in another alternative, when the relationship with particular former or current customers or clients is of concern to a prospective client, the prospective client may ask for screening of only those particular clients that concern him.

In an alternative aspect of the present invention, the service provider does not declare whether he is already providing a certain type of service to certain types of clients. Rather, the service provider and each of clients declare each service exchanged, the same way Mary and Jack declare they are in a relationship by Mary sending an add request and declaring the relationship as engagement and Jack accepting the request.

At 3004, the user is prompted to input one or more pictures. At this stage the pictures are checked by the system to make sure they are clear and they belong to a same person. The pictures may also be checked versus public records. Once a picture is uploaded and screened by the system administrator, it cannot be deleted unless another picture is uploaded and approved by the administrator. This is to guarantee that a sufficient number of screened pictures are available on the profile.

In one aspect, once a picture is uploaded and screened by the system administrator, it cannot be deleted by the user after the expiration of a grace period. For example, a 24-hour grace period may be provided to the user during which he may change his pictures. Once the grace period expires, he may no longer delete or modify the picture that he provided to the website.

At 3005, the user is prompted to make a payment. The payment may be made by credit card. In some embodiments, the use of a credit card may be mandatory as an additional means of verifying user identity.

At 3006, a user profile is created for the user and his account is activated.

At 3007 the method of registration or signup ends.

Figure 4:
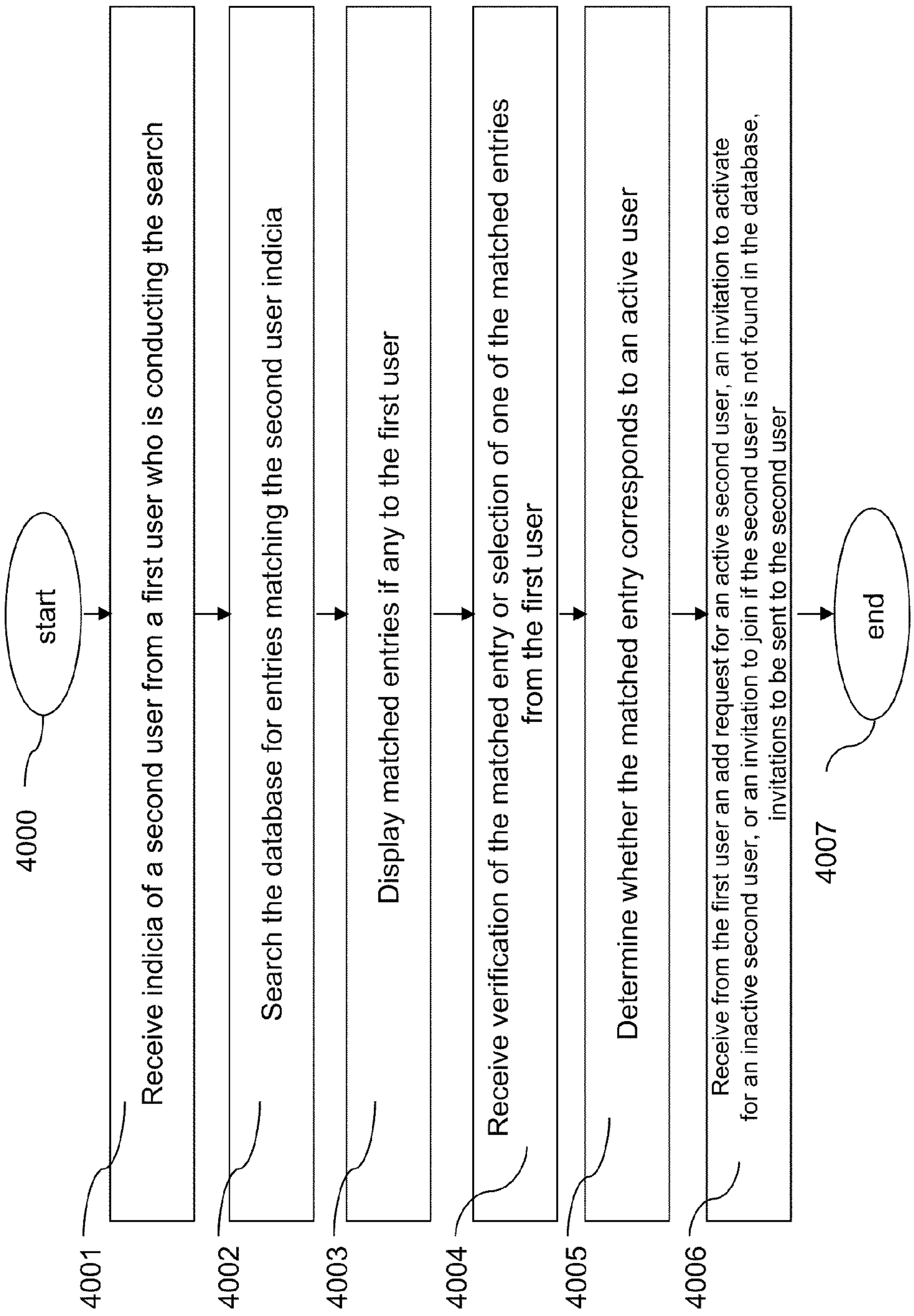
FIG. 4 shows a flowchart of an exemplary method of conducting a search, according to aspects of the present invention.

FIG. 4 shows a flowchart of an exemplary method of conducting a search, according to aspects of the present invention.

A first user who is already registered with the system and has a profile, may conduct a search for another user, namely a second user, using the system. An exemplary method of conducting such a search is described with respect to the flowchart of FIG. 4.

The method begins at 4000.

At 4001, some indicia of the second user is received from the first user. The first user may enter the first and the last names of a person that he is searching for or may scan and enter a photograph of the subject.

Other indicia of the second user may be used in various embodiments and implementation of the present invention. For example, the first user may be able to enter the driver's license, passport number, or license plate number of the second user. However, because the transparency provided by the system is generally voluntary on both sides, the first user has access to or may ask for the name of the second user when he decides to use the system.

At 4002, the system conducts a search of its database for entries that match the entered indicia. None, one or more entries may match the entered indicia.

At 4003, if the search is able to locate any matching entries, the matching entries are displayed to the first user.

For example, pictures, the dates the pictures were uploaded, username, and active or inactive status of one or more second users who match the entered indicia are displayed to the first user.

Pictures of the second user may be particularly useful to the first user because they enable the first user to determine whether any of the second users being displayed to him by the system in fact match the one he had in mind. The upload dates of the pictures allow the first user to consider the effect of aging on the appearance of the people shown in the pictures.

At 4004, the selection of one of the matched entries is received from the first user.

At 4005, the system checks to determine whether the selected or verified second user is an active user. For example, a user may inactivate her membership and when a user does not pay membership fee, her profile would be inactivated by the system.

At 4006, the system may receive, from the first user, an add request for an active second user, an invitation to activate for an inactive second user, or an invitation to join if the second user is not found in the database and is indeed not a user and rather a prospective user of the system.

If the second person has an active profile, the first user may request that an add request is sent to the second user along with the relationship type that he has with the second user. For example, the add request may request that the second user adds the first user as her spouse, fiancé, or casual date.

If the second user has an inactive status, the first user may request that an invitation to activate or to join is sent to the email address of the second user through the system of the present invention. The email address is to be provided by the first user if the second user has never been a user of the system and is merely a prospective user.

At 4007, the method ends.

FIG. 5 shows one exemplary presentation of matched entries that result from the search stage of FIG. 4, according to aspects of the present invention.

In FIG. 5, a first user that is called Susan Jackson searches for a second user by the name of John Smith. One exemplary display of the search results shows three pictures with an explanation indicating: "Your search returned three profiles. Click on the picture of the person you are looking for to see all his pictures. If you don't see the picture of the person here, you can email him a request to create a profile."

The matched entries that are returned for display to the first user have the usernames jsmith, JohnS, and dragon. The reason "dragon" is returned is that the real name of the user who is using the username "dragon" may be John Smith, J. Smith, John S, or another name that is found to have a correlation with the search string "John Smith" according to the search method that is used by the system.

The dates of the pictures are also shown to make it difficult for a user to quickly change his profile picture and thereby cause a person who searches for the user name, to mistakenly assume that the profile belongs to another person with the same name.

For example, Jack Smith and Mary Brown are married and their profiles are linked and Jack has used his real pictures in his profile. Jack wants to date Susan. He uploads some new pictures, which do not belong to him. When Susan searches for "Jack Smith," she sees there is a profile under the name, but the pictures are not her Jack Smith's pictures so she would think that her Jack Smith has no profile. If Jack quickly uploads his old pictures again, then Mary may not notice this and he can cheat. On the other hand, if the dates of uploading of the pictures are displayed, both Susan and Mary will know Jack was up to something.

Figure 6:
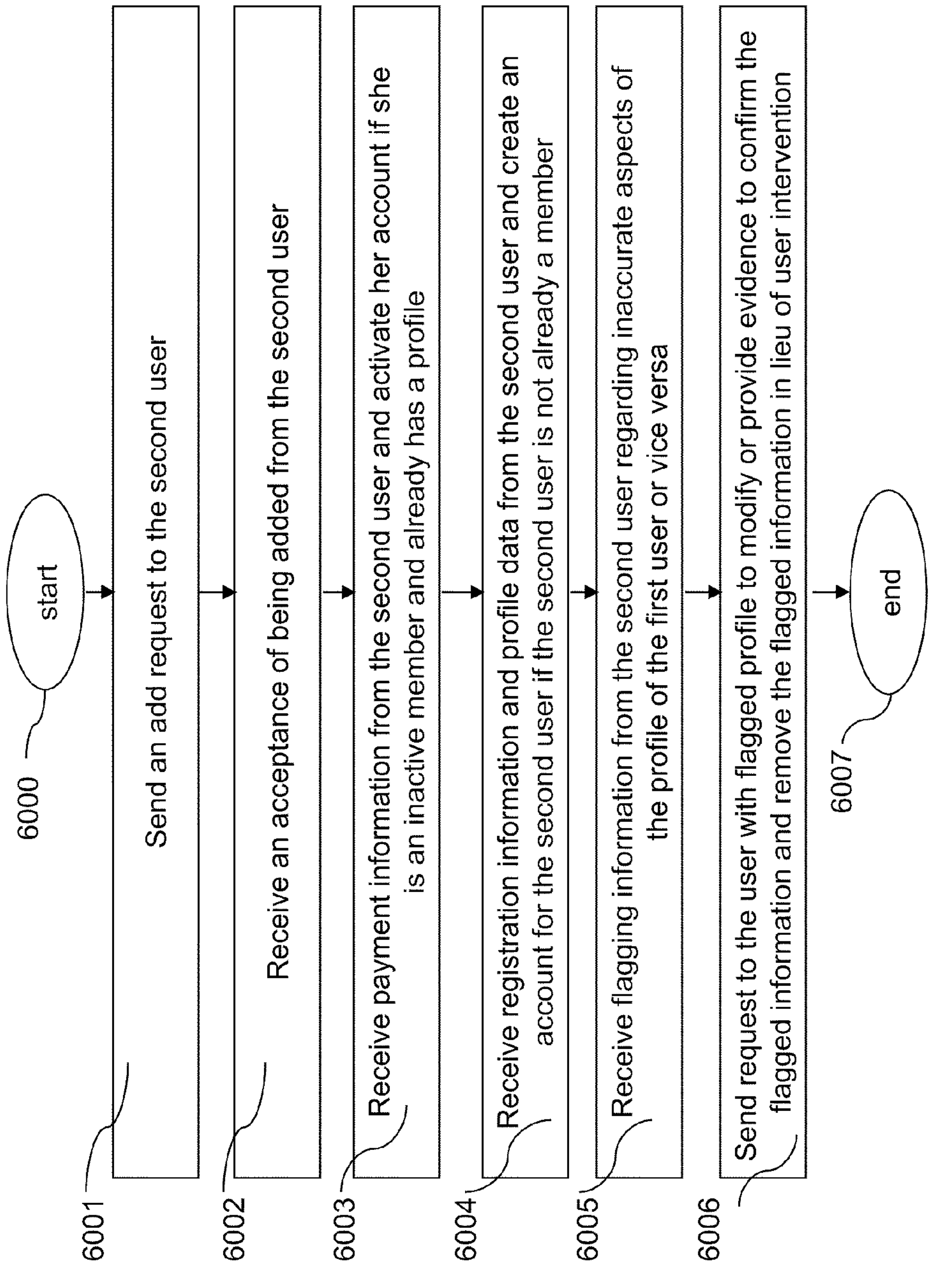
FIG. 6 shows a flowchart of an exemplary method of adding a second user by a first user, according to aspects of the present invention.

FIG. 6 shows a flowchart of an exemplary method of adding a second user by a first user, according to aspects of the present invention.

The method begins at 6000.

At 6001, the system sends an add request to the second user. The add request includes the information of the first user and also includes the type of relationship that is specified by the first user to exist between the first user and the second user. For example, the first user may have specified that the second user is his spouse, fiancé, or current date.

At 6002, the system receives an acceptance from the second user. The acceptance indicates that the second user consents to being added to the profile of the first user under the relationship type specified by the first user. For example, the second user accepts to being noted as the wife of the first user on the profile of the first user.

At 6003, if the second user is an inactive member and already has a profile, the system receives payment information from the second user and activates her account.

At 6004, if the second user is not a member and does not have a profile, the system receives registration information and profile data from the second user and creates an account for the second user. In this case, the second user starts out as a prospective user and is converted to a true user after registration.

At 6005, the system receives flagging information from the second user regarding inaccurate aspects of the profile of the first user.

At 6006, the system sends request to the first user to confirm or modify the flagged information. For example, the first user may confirm that a flagged profile picture is indeed his or modify the flagged picture to show a true picture of himself. Because the flagged information is now disputed by the second user and the second user is a person or entity that is trusted and possibly invited by the first user, the first user has to provide proof that the flagged information is true as is. Unless modified or supported by evidence, the system administrator may remove the flagged information after a grace period.

While the flagged item may be removed or corrected, the fact that an item of information was flagged on a profile will remain a part of the profile as a notation or by being reflected in the credit score associated with the profile.

At 6007, the method ends.

When an invitation or an add request is sent by the system from a first user to a second user, and the request is accepted by the second user, each user's name is added to the profile of the other user and each user can view the other user's profile. Profile information for a user may include the names of all previously added persons, or entities, and their relationship to the user as well as the timeline and the dates pictures were uploaded. One feature may prevent displaying actual names of some or all of the previous relationships if desired. Control over the display of the actual names may lie with the owner of the profile or with the persons who consent to being added to his profile at the time of consent, when the profiles are severed, or at another predetermined time. Other schemes may be used to allow the users whose names may appear on a profile to control the mention of their name. False names and use of other people's names are unlikely to slip through the system because the identity of the users is verified by reference to reliable databases based on reliable information such as social security, and driver license. Additionally, the payment using credit card and address verification through sending a letter to the address containing a random code may be used to further strengthen the verification. Further, additional safeguards, such as imposition of legal liability, may be used to discourage the inclusion of a false name or inclusion of a name without the person's consent.

A person may add more than one person at a time. For example, a newly separated first user might wish to date several second users simultaneously. The system would show this lack of exclusivity to all of the second users who are linked to this first user. If this degree of transparency is not desirable to the first user at an early stage of his various relationships, he may postpone using the system until a later time.

One feature that a user has to keep in mind is that the point of transparency is that you may not cover up past data once they have been entered into the system. A user may choose to delete the name of a former friend but the system would not permit him to conceal the existence of the former friend or the duration or type of the relationship.

Still, in one aspect of the present invention, the users are provided the option of concealing whatever information which is not pertinent to current relationships and is, for example, at least one month old. Whether or not users may hide past relationships can be decided based on the type of the relationship. For example, in client-provider relationships the system may be implemented not to allow the users to hide their past relationships while for the romantic relationships the users are allowed to do so.

Moreover, when someone does not care that a first user is already in a committed relationship and both the first user and this other person are united in keeping their relationship a secret, the aspects of the present invention are not applicable. The same is true of the situations involving industrial espionage when the spy and the company who hires him are in agreement regarding keeping their dealing secret. Such situations that involve some type of conspiracy are usually discouraged by punishments imposed by law. The transparency created by the systems and methods of the present invention, however, would still make the world smaller for the cheaters.

FIG. 7 shows one example of the profile information regarding a user that is presented to a linked user, according to aspects of the present invention.

Following the display example shown in FIG. 5, the first user Susan identifies JohnS as the John Smith intended by her and asks the system or the service to send JohnS an add request. In FIG. 7, the add request from Susan is accepted by John Smith and they can each view the other's profile. FIG. 7 shows an exemplary profile for John Smith.

The exemplary profile begins by a credit score or a relationship credit score, RCS, and continues by listing the former and current relationships of the second user together with their respective types and dates.

For example, the profile may show the following:

John Smith, johnS (RCS=658)

History:

Nov. 23, 2005 (created profile)

Nov. 23, 2005 (uploaded pictures pix1, pix2, pix3, pix4, and pix5)

Nov. 25, 2005 (married to P1)

Feb. 10, 2006 (deleted P1)

Feb. 10, 2006 (changed the status to divorced)

Jul. 12, 2006 (uploaded a new pic (pix6))

Jul. 14, 2006(dating P2)

Aug. 2, 2006 (deleted P2)

Jan. 4, 2007 (subscription expired)

Mar. 2, 2008 (renewed subscription)

Apr. 3, 2008 (dating Mary White)

May 24, 2008 (deleted Mary White)

Dec. 22, 2009 (dating Susan Jackson)

As the above example indicates, some of the people listed in user's profile, such as Mary White and Susan Jackson, are mentioned by their name while others, such as P1 and P2, are not. Either the first user or P1 and P2 may elect that P1 and P2 are not to be shown by name. However, the system would still manifest their existence and the type and the period of first user's relationship with them.

Each user can block his name from appearing on others' profiles and can also block names of the others from appearing on his profile. The system rewards transparency and thus reduces the RCS in response to name blockings. Further, even if certain blocked names are subsequently unblocked, the formula for the RCS may be such that the impact of each blocking on the score remains for several months after the unblocking. Thus, a user cannot induce a jump in his RCS right before a new prospective date.

When the relationship between two users is changed, the status of each may be affected. If the status change is reflected by one of the users on his profile, then the system would generate an entry corresponding to this event for the other profile as well. For example, suppose the first user and the second user, who were married, are subsequently divorced. If the first user changes his status from married to single, the system would generate a corresponding entry for the second user and changes her status from married to single as well.

While the information regarding the past relationships may not be deleted from a profile, a user may prevent another user from viewing his profile by deleting the other user from his profile. If one user deletes a second user from his profile, the second user is notified by the system that she has been deleted from the profile of the first user. As a result of the deletion the link is severed and none of the two users will be able to view the other user's profile. Moreover, any information regarding a past relationship between the two users, but for specific names, remains on both profiles and an entry corresponding to the deletion event is added to each of the two profiles.

In an alternative aspect of the present invention, the users are given the option of concealing past items of information that are not pertinent to their current relationships after a predetermined amount of time has passed.

Figure 8:
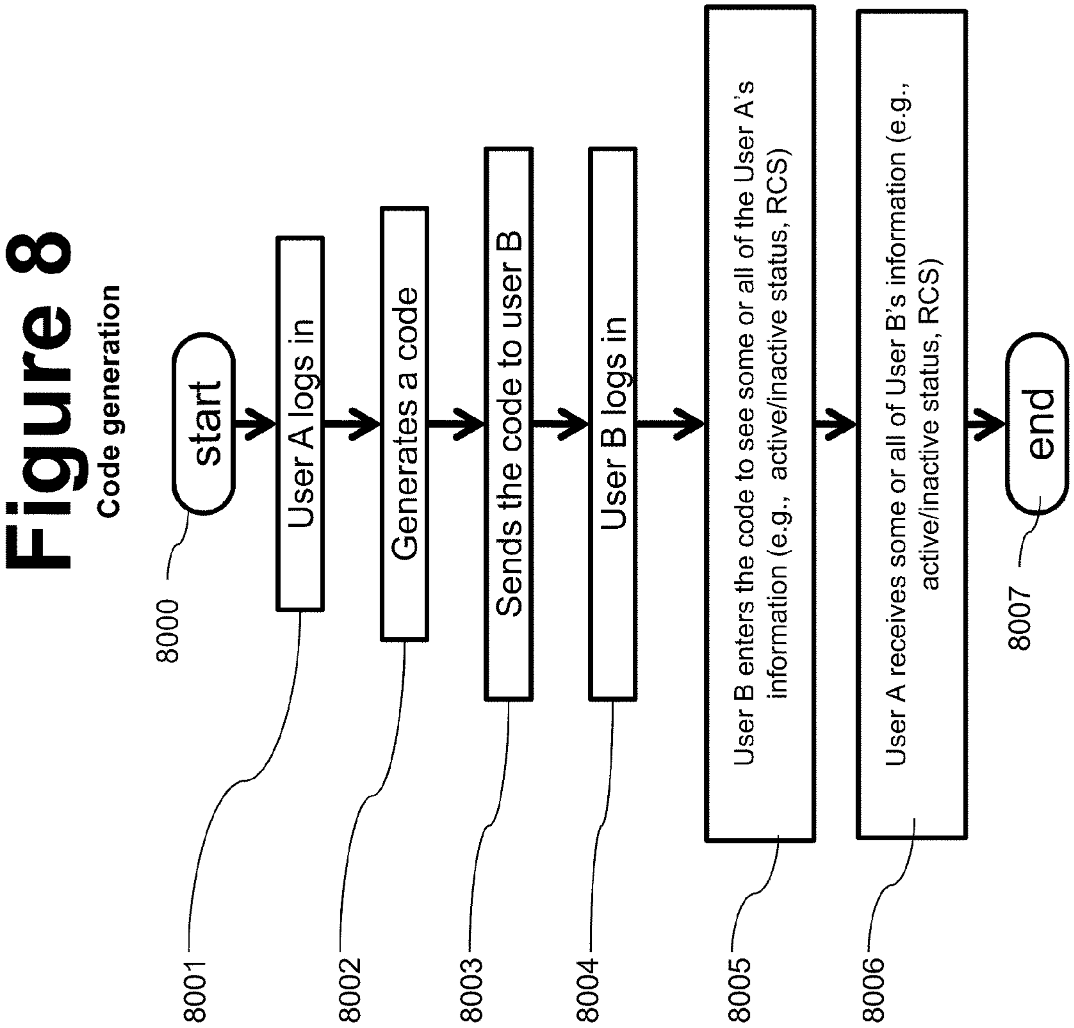
FIG. 8 shows a flowchart of an exemplary method of code generation for viewing a user's relationship credit score, according to aspects of the present invention.

FIG. 8 shows a flowchart of a method of code generation for viewing a user's relationship credit score or partial profile, according to aspects of the present invention.

Like a financial credit score, the relationship credit score, or RCS, may be for example a number between 100 and 700. It is determined in manner to provide a measure of the value, quality and reliability of the information on a user's profile. For example, RCS may be determined as a function of the length of the subscription and the visibility of the names on the profile. The RCS could be set to increase as the duration of the subscription increases. A ceiling may be put in place for the increase of the RCS with the length and duration of membership or subscription. The RCS may be set to decrease if some of the names on the profile are blocked.

In one aspect of the present invention, the RCS is displayed everywhere a user's name appears on the website unless his subscription has expired and his profile is inactive. The use of the RCS is helpful when an invitee dates only people with a high RCS. It is also useful to show to the invitee that the user has an active profile.

RCS may be used with a code generation mechanism as a method of self-introduction by a user to a non-user. A user can generate a code and send it to a non-user to let the non-user check the user's RCS without knowing his name or having access to his profile. The system may show the user's pictures to the non-user to allow the non-user verify that the RCS in fact belongs to the person of interest to the non-user. In some embodiments, only a user can check another user's RCS. This feature that permits a second party to access a first party's RCS by using a code generated by the first party is particularly useful for online daters. When the code is used, and both sides are registered users of the system of the present invention, then the RCSs of both sides are provided automatically to the other side.

FIG. 8 includes a flowchart of one exemplary method of using a code when both sides are registered users of the system.

The method begins at 8000.

At 8001, User A logs in to the system.

At 8002, User A generates a code.

At 8003, User A sends the generated code to User B.

At 8004, User B logs in.

At 8005, User B enters the code to see some or all of User A's information. The information includes active or inactive status of User A, RCS of User A if User A is active, and pictures of User A.

At 8006, User A receives some or all of User B's information in a reciprocal manner.

At 8007, the method ends.

In the above method, while both an active and an inactive user may utilize the system to some degree and a user's name and pictures are shown to the other user irrespective of his active or inactive status, the RCS of a user is displayed only when the user is active.

The code may be set to expire after a predetermined time or a predetermined number of uses. Alternatively, a link such as a URL can be generated instead of a code. Another alternative is linking User A's profile to User B's profile, so both users can see some of the other user's information during a limited time period. Another alternative is letting only User B see User A's information.

Figure 9:
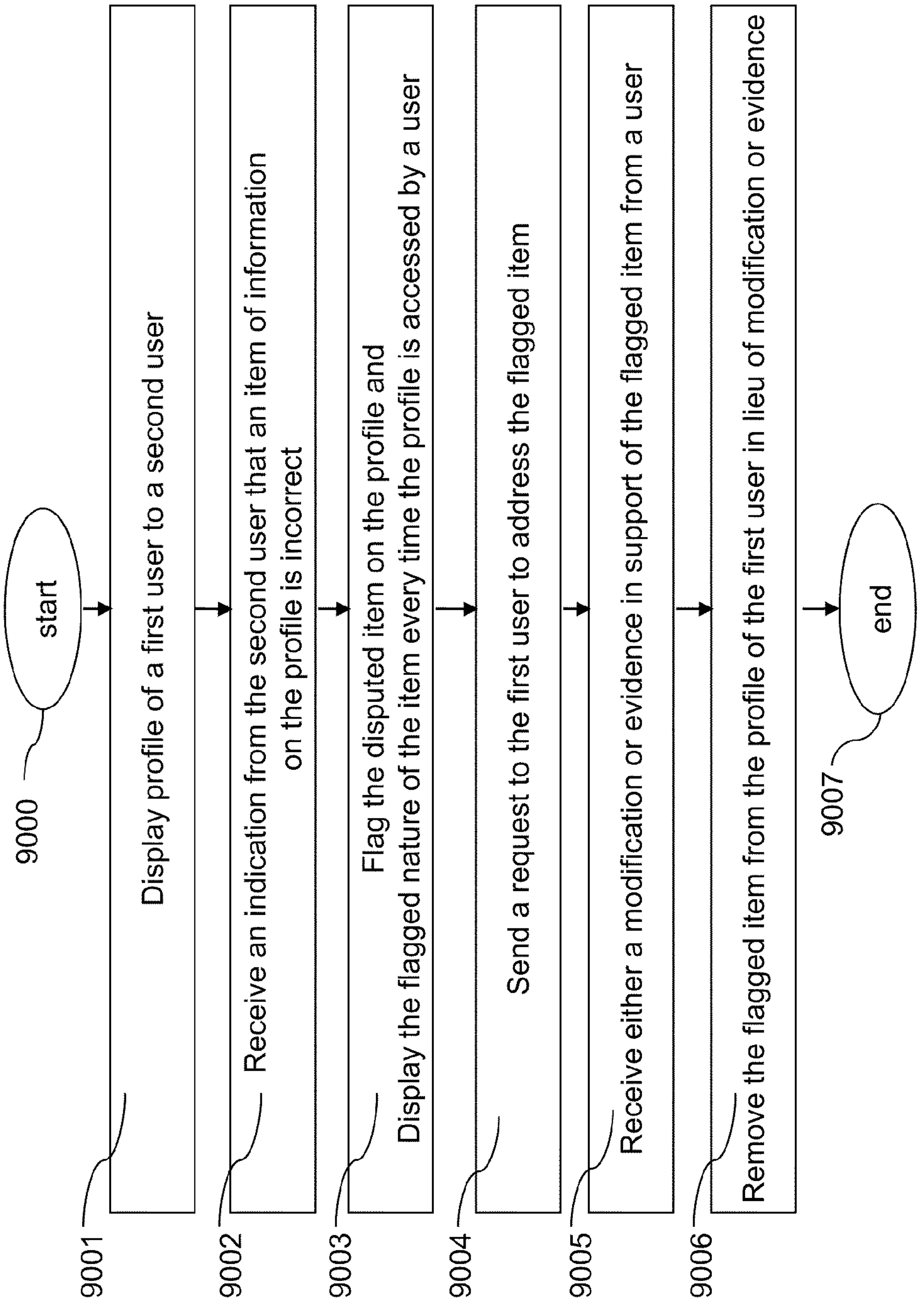
FIG. 9 shows a flowchart of an exemplary method of flagging a disputed item of information on a profile of a user by another linked user, according to aspects of the present invention.

FIG. 9 shows a flowchart of a method of flagging a disputed item of information on a profile of one user by a linked user, according to aspects of the present invention.

The method begins at 9000.

At 9001, the system displays the profile of a first user to a second user. The second user is also a registered user of the system and her identity has been verified by the system.

At 9002, the system receives an indication from the second user that an item of information on the profile of the first user is incorrect.

In some embodiments, flagging may be permitted only to second users who are linked to the profile of the first user or to invitees of the first user. In other words, only those users who have had a relationship with the first user or are invited to begin one, may dispute a piece of information on his profile.

The identity of a second user who flags an item of information on the profile of a first user may be revealed to the first user.

At 9003, the system flags the disputed item on the profile. Every time that the profile is viewed by a user, the flagged nature of the item is also displayed which indicates that the particular item of information on the profile may not be accurate.

At 9004, the system sends a request to the first user to address the flagged item. The first user can modify the flagged item or he may dispute the flagging in which case he would have to provide evidence supporting the item as is. The first user will be informed of the identity of the second user who caused the flagging of the item of information.

At 9005, the system receives either a modification of the disputed and flagged item or evidence in support of the flagged item being as is from the first user.

At 9006, if the first user does not respond to the flagging of the item, the system removes the flagged item from the profile of the first user. A grace period may be granted after the request is sent to the first user for clarification.

During the period of flagging another linked user is allowed to step in and confirm or dispute the flagging.

At 9007, the method ends.

In the example provided in FIG. 7, if Susan believes that one or more of the pictures on John's profile do not belong to John or any information on John's profile is not correct, she can flag the profile or flag the disputed information on the profile. Such flagged information may be displayed every time John's pictures or profile are displayed. A flagged picture or profile may be eventually deleted by the system administer.

Exemplary Romantic Relationship Scenario

One exemplary scenario for use of the methods, devices, and systems of the present invention is provided below. Fraud prevention is also addressed in the context of the exemplary scenario. Finally, deletion and inactivation of the accounts are further described.

Suppose, Jack is married to Rachel.

Both Jack and Rachel create profiles and set their marital status to married and add one another.

Now, if Jack meets Susan and claims he is single, Susan can search and find Jack's profile. Susan can then send an add request to Jack.

If Jack accepts the request, Susan will see that Jack is married.

If Jack rejects the request, Susan will know Jack is hiding something.

This works only if all parties use the system such that Rachel and Jack set up a profile beforehand and Susan asks to be added to Jack's profile.

If Jack denies having a profile, a search for his name will display his pictures. Jack cannot deny having a profile because Susan searches and sees Jack's pictures even before she is added by Jack.

If Jack does not use his real name when registering, he would still have to provide some form of identification or other evidence of his identity.

In one aspect of the present invention, the name is verified against reliable data bases. In one aspect, the system does not ask for driver's license or notarization, rather the legal name, date of birth, and home address are verified against a third party database which is based on driver's license and social security information. Furthermore, the name and the address of the credit card used for making the subscription payment are checked versus the name and address provided by the user. Finally, a letter is sent containing a random code to the address provided by the user. The user has to log-in to the website and enter the random code to finish the registration process.

If he uses his driver's license to register, the information will be verified against DMV records and his identity would be revealed.

If he uses a notarized form declaring that he is who he claims to be, a misrepresentation on the form is breaking the law.

If Jack does not use his real pictures, once he uses his profile and adds a person, that person can flag the pictures which do not belong to Jack.

If Jack creates multiple profiles and uses different profiles when interacting with different people, the fake profiles would be detected.

If the profiles are under different names, then the profiles under the fake names can be detected as discussed above.

If the profiles are under the same name, but use different pictures, the profile with the fake pictures will be detected by the verification stage of the process or are flagged by users who are linked to Jack, when flagging is an option, or they may remain on the profile as is to be detected by a user who is later linked to Jack. For example, for two profiles that are under the same name Jack, when the picture on one profile belongs to a child while Jack is an adult, or the face of the person is not visible in the picture, the pictures are detected by the administrator who reviews the pictures. Even if the wrong pictures remain on the profile, anyone who has met Jack or will meet Jack can tell he has used fake pictures on his profile.

Once an account is created, it cannot be deleted. This is similar to placing your name or picture on the internet. Once the name or picture is uploaded to the internet, it may be cached by different search engines and web archives such that it may no longer be effectively deleted. This is to prevent users from deleting their account and joining later which erases their profiles.

In an alternative aspect, the users are permitted to change their pictures. They are not permitted to delete a picture, only replace it with another picture after the new picture is approved.

If an account is inactive, its corresponding RCS will be invisible. Further, the RCS is decreased upon reactivating the account.

Figure 10:
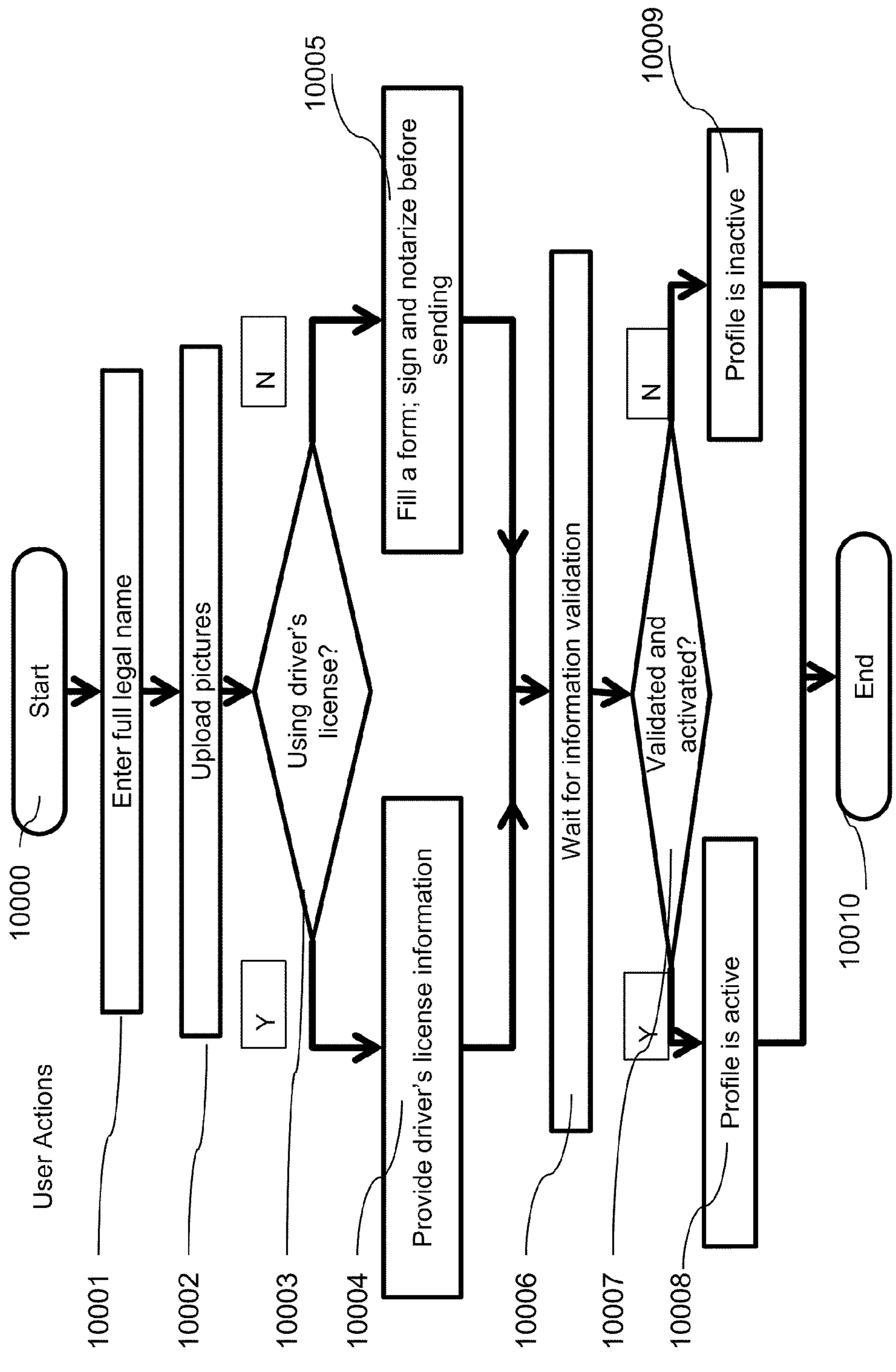
FIG. 10 shows a flowchart of a more detailed method of registration from the viewpoint of a prospective user, according to aspects of the present invention.

FIG. 10 shows a flowchart of a more detailed method of registration from the viewpoint of a prospective user, according to aspects of the present invention.

The method begins at 10000.

At 10001, the user enters his full legal name.

At 10002, the user provides his photographs together with the date they were taken.

At 10003, the user is asked whether he will be providing his driver's license number.

At 10004, if the user is providing his driver's license number, the number is entered by the user and received by the system.

At 10005, if the user is not providing his driver's license number, he is prompted to complete a form declaring that the name he provided is his true legal name, sign and notarize the signature and provide the signed and notarized form.

At 10006, the user is prompted that he has to wait for validation and verification of the information that he has provided to this point.

At 10007, the system determines whether the information is verified.

At 10008, if the information is verified, the user profile is activated and he is notified of that.

At 10009, if the information is not verified, the profile that has been created for the user remains inactive and the user is notified of that.

The method ends at 10010.

Figure 11:
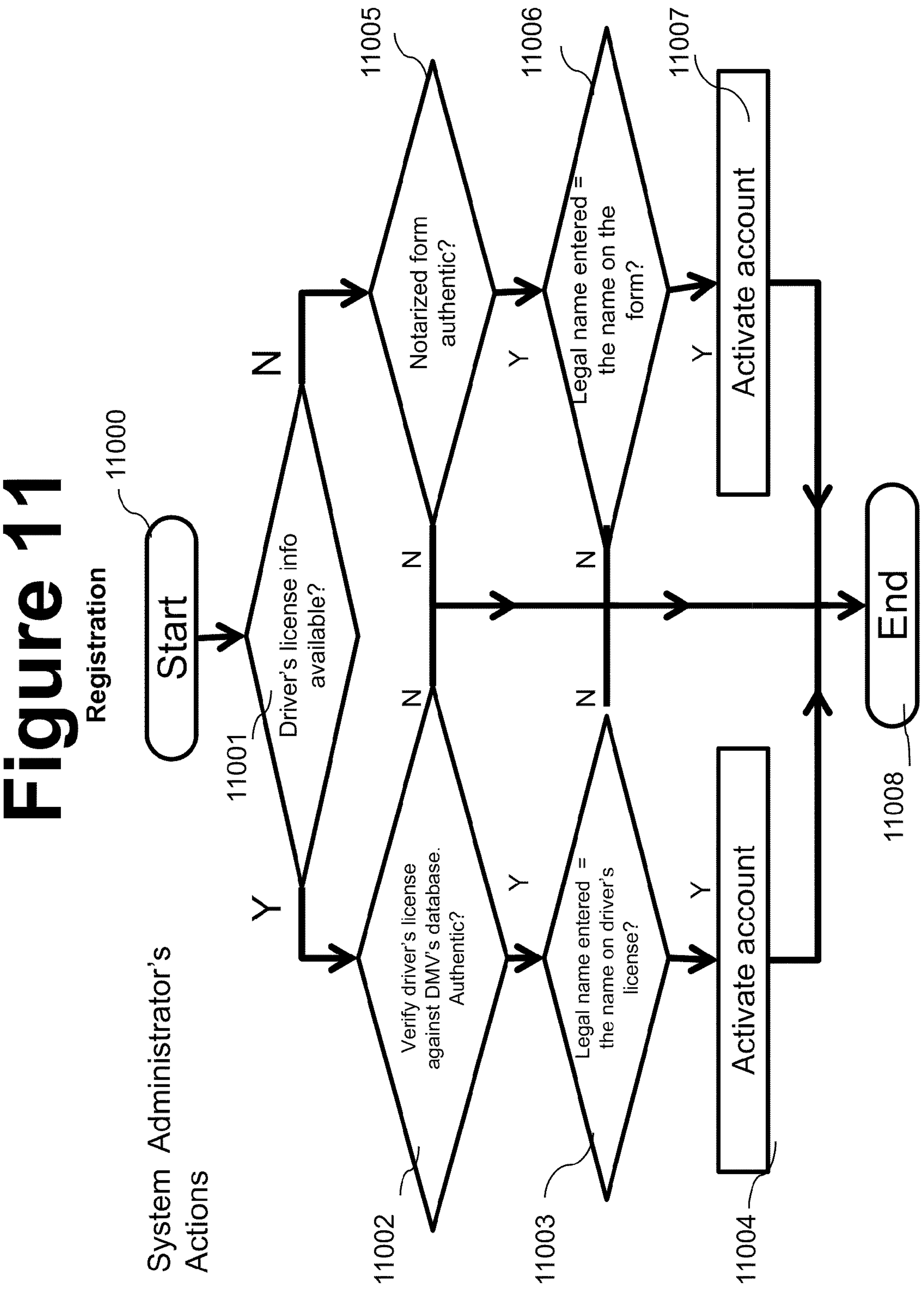
FIG. 11 shows a flowchart of a more detailed method of registration from the viewpoint of the system administrator, according to aspects of the present invention.

FIG. 11 shows a flowchart of a more detailed method of registration from the viewpoint of the system administrator, according to aspects of the present invention.

The method begins at 11000.

At 11001, the system administrator determines whether a driver's license number has been provided. In one aspect, the name provided by the user may be verified against a third party database.

At 11002, if the driver's license information has been provided, the system administrator verifies the driver's license against the government database to determine whether the picture and the name that are provided are indeed authentic.

At 11003, if the driver's license information has been provided, and if the driver's license is also determined to be authentic, the system determines whether the legal name entered by the prospective user is the same as the name on driver's license.

At 11004, if the legal name that is entered matches the legal name on the driver's license, the account is activated.

At 11005, if the driver's license information has not been provided, the system administrator verifies whether the notarization of the form is authentic.

At 11006, if the notarized form has been provided, the system determines whether the signature that is notarized matches the name provided by the prospective user.

At 11007, if the legal name that is entered matches the legal name signed on the notarized form, the account is activated. Otherwise, the account is not activated.

The method ends at 11008.

Figure 12:
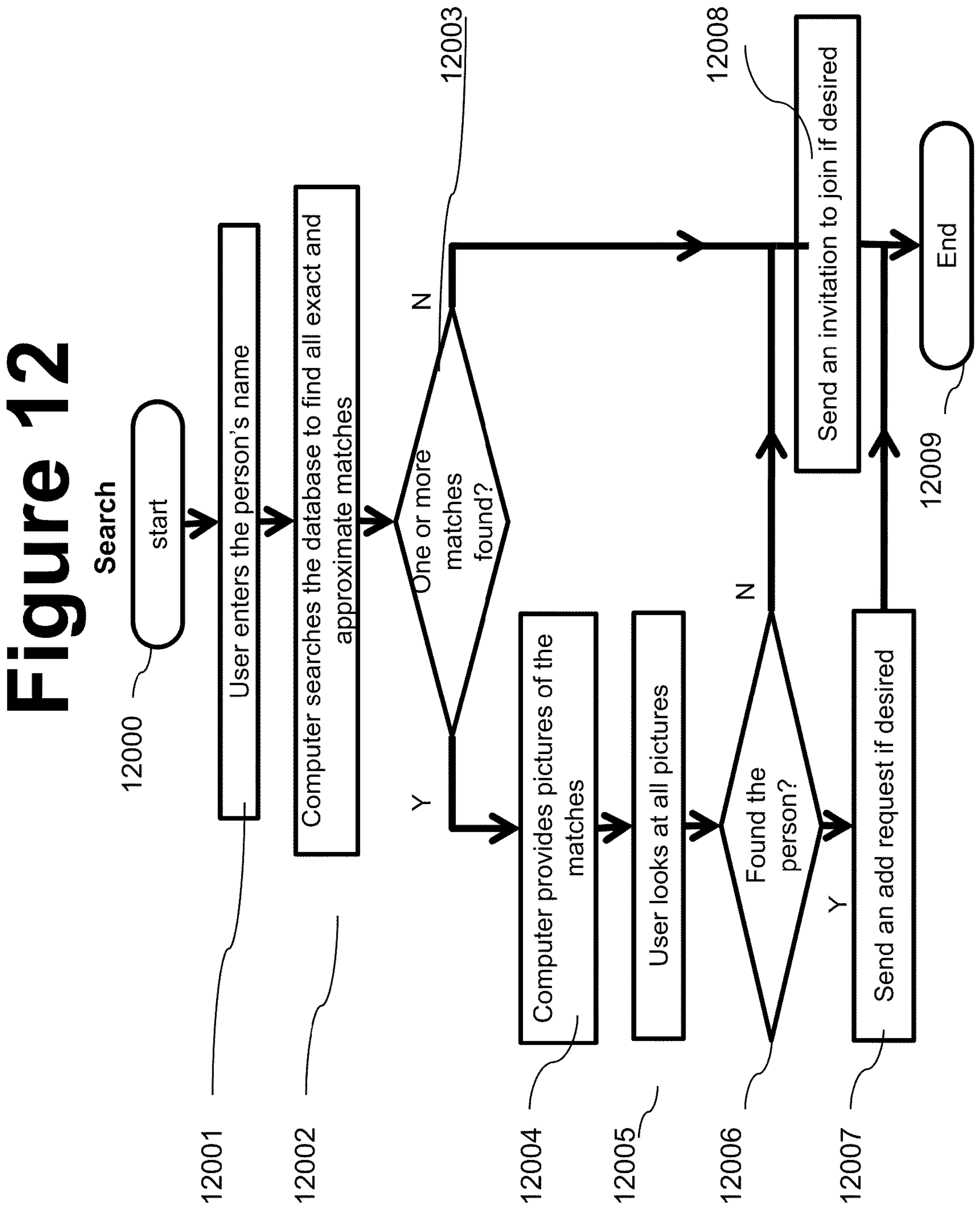
FIG. 12 shows a flowchart of a more detailed method of searching for a particular user, according to aspects of the present invention.

FIG. 12 shows a flowchart of a more detailed method of searching for a particular user, according to aspects of the present invention.

The method begins at 12000.

At 12001, user enters the name of the person he is searching for.

At 12002, the computer searches the database to find all exact and approximate matches.

At 12003, the computer determines whether one or more matches are found.

At 12004, if any matches are found, the computer displays pictures of the matches to the user.

At 12005, the user is provided with time to view the displayed pictures.

At 12006, the user is asked whether he has found the person he is searching for.

At 12007, if the user has found the desired person, the user is asked whether he wants to send a message and a message is sent by the system to the subject of the search.

At 12008, if the search does not yield any matches or if the desired person is not one of the matches that are found by the system, the user is asked whether he would like to send an email message to the searched person and ask her to join the service. The system may send a message to the subject of the search if authorized by the user.

The method ends at 12009. The present invention has been described in relation to particular examples, which are intended to be illustrative rather than restrictive, with the scope and spirit of the invention being indicated by the following claims and their equivalents.

The invention claimed is:

1. A method for increasing trust in a relationship by providing transparency regarding past and present relationships, the method being implemented on a system having a database for storing input data, an input and output interface for receiving the input data and displaying output results, a processor for controlling the database, processing the input data and generating the output results, and a transceiver for establishing communication with a network through which the input data and the output results may be transmitted or received, the method comprising:

receiving registration information from prospective users of the system;

verifying the registration information for authenticity to obtain verified registration information, wherein the verified registration information includes legal name verified against the records of at least one of a government agency and a reliable private agency;

receiving at least one picture of the prospective user or an agent of the prospective user when the prospective user is an entity;

registering the prospective users as verified registered users by establishing a profile for each verified registered user, wherein the user is prevented from registering when the registration information cannot be verified against the records of at least one of a government agency and a reliable private agency;

linking a first profile to a second profile responsive to a link request from a first verified registered user having the first profile and an acceptance of the link request by a second verified registered user having the second profile; and allowing the first verified registered user and the second verified registered user to view the second profile and the first profile, respectively, wherein the link request includes relationship information of the first verified registered user with respect to the second verified registered user and the acceptance confirms the relationship information by the second user, wherein the profile of each verified registered user includes the verified registration information and the relationship information of the verified registered user, wherein each user is permitted to register no more than once and each verified registered user is permitted no more than a single profile, and wherein a history of modification of the profile is recorded in the profile.

2. The method of claim 1, wherein the relationship information for each verified registered user includes either a solitary status of the verified registered user or an indication of existence of a relationship between the verified registered user and at least one other verified registered user, a characterization of a type of the relationship, name of the other verified registered user, and any subsequent modification to the type of relationship including a ceasing of the relationship.

3. The method of claim 1, further comprising:

receiving a delete request from the first verified registered user for deleting the second verified registered user;

severing a link between the first profile and the second profile, the link having been generated responsive to the linking of the first profile to the second profile;

updating the relationship information in the first profile and the second profile to indicate the severing of the link;

maintaining a history and data regarding the link in the relationship information in the first profile and the second profile; and preventing the first verified registered user and the second verified registered user from viewing the second profile and the first profile, respectively, after the severing of the link, wherein the delete request is a request for deletion of the link between the profiles.

4. The method of claim 1, further comprising:

receiving a flagging of the first profile by the second verified registered user, the flagging being an indication that one or more items of information in the first profile are disputed by the second verified registered user;

providing the first user notice and opportunity to respond by modifying disputed items of information on the first profile or by providing evidence in support of the disputed items of information;

removing the disputed items of information when no convincing response is received from the first user or from another verified registered user within a grace period; and including and maintaining a notation of the flagging in the first profile.

5. The method of claim 1, further comprising:

receiving a search request from the first verified registered user asking a search for a searched person or searched entity to be conducted within the database, the search request being prior to or contemporaneous with the receiving of the link request from the first verified registered user; and conducting the search according to identification information provided by the first verified registered user, wherein the searched person or the searched entity belongs to a category selected from the verified registered users, the prospective users, and non-users.

6. The method of claim 5, wherein the identification information includes a name or a partial name of the searched person or the searched entity, the method further comprising:

disregarding the search request when the identification information is a generic criterion capable of being applicable to a group of persons or entities irrespective of their legal name.

7. The method of claim 6, wherein the identification information includes a picture of the searched person or a picture of an associate of the searched entity.

8. The method of claim 2, wherein the verified registered user is a person, and wherein the type of the relationship is selected from husband-wife, husband in committed monogamous relationship-wife in committed monogamous relationship, husband in open marriage-wife in open marriage, fiancé-fiancé, date-date, friend-friend, or a relationship defined by mutual agreement of both verified registered users.

9. The method of claim 2, wherein the verified registered user is an entity, wherein the agent is a principal, an officer, or a market representative of the entity, wherein the type of the relationship is selected from service provider-client, seller-buyer, vendor-vendee, principal-contractor, employer-employee, grant writer-granting entity, or a relationship defined by an agreement, wherein the relationship information includes keywords indicating a type of job performed or to be performed, and wherein the relationship information further includes a nature of the agreement between the linked users.

10. The method of claim 1, wherein one, some, or all of the following are implemented:

a name of the second verified registered user within the relationship information of the first verified registered user is blocked from being viewed by other verified registered users having profiles linked to the first profile, a name of the first verified registered user within the relationship information of the second verified registered user is blocked from being viewed by other verified registered users having profiles linked to the second profile, and an event in the first profile is blocked from being viewed by other verified registered users having profiles linked to the first profile when the event is not related to a current relationship of the first verified registered user and a predetermined length of time has passed from an end or a beginning of the event, wherein the relationship information includes information regarding current and past relationships, and wherein the event is the linking of the first profile to the second profile.

11. The method of claim 10, further comprising:

calculating a credit score for measuring a degree of reliability, or a value, associated with the profile of each verified registered user; and including the credit score in the profile, wherein the credit score is determined as a function of:

length of existence of the profile, duration of active status and periods of inactivation of the profile, degree of transparency of the profile, transparency reducing as more names or events are blocked within the profile, and degree of verified flagging of the profile, and wherein the credit score is selected from a group consisting of a numerical value and a non-numerical value including Very Good, Good, Bad, and Very Bad.

12. The method of claim 1, further comprising:

generating a code responsive to a request by the verified registered user;

sending the code to a recipient, the recipient being another verified registered user or a prospective user; and providing a gradual, time-limited, or selective exposure of the profile of the verified registered user to the recipient upon activation of the code by the recipient.

13. The method of claim 1 further comprising:

assigning an inactive status to the first profile; and preventing access to the first profile from all verified registered users and prospective users, wherein the inactive status is assigned responsive to nonpayment of subscription fees or upon request by the first verified registered user or by a system administrator engaged in administering the system.

14. The method of claim 1, further comprising:

receiving limited registration information from a prospective user applying for a limited account;

verifying the limited registration information for authenticity;

registering the prospective user as a limited access registered user; and granting the limited access registered user permission to view a subset of information in the profiles of the verified registered users, wherein the limited registration information is selected from a group consisting of less demanding amount of information than the registration information, more demanding amount of information than the registration information, and equally demanding amount of information as the registration information.

15. The method of claim 1, further comprising:

receiving the registration information from two prospective users applying for joint accounts;

verifying the registration information;

registering the two prospective users as joint users having two joint profiles; and displaying an indication of the joint profiles responsive to a search request for either of the joint users.

16. A system for moderating voluntarily established transparency in relationships, the system comprising:

a communication network for receiving updated authentic records from at least one of government agencies and reliable private agencies;

an input interface for receiving registration information from prospective users of the system and for receiving link requests;

a database for storing the registration information;

a processor for:

verifying authenticity of the registration information against the public or non-public records to obtain verified registration information, wherein the verified registration information includes legal name verified against the authentic records from at least one of government agencies and reliable private agencies;

registering the prospective users as verified registered users by establishing a profile including a legal name for each verified registered user, the profile including some or all of the verified registration information, wherein the user is prevented from registering when their legal name cannot be verified against the authentic records from at least one of government agencies and reliable private agencies, and linking a first profile to a second profile, the first profile associated with a first verified registered user sending a link request and the second profile associated with a second verified registered user consenting to establishment of a link pursuant to the link request, the link request specifying relationship information between the first user and the second user, the relationship information being added to the first profile and the second profile responsive to the linking; and an output interface for displaying information in linked profiles to the verified registered users associated with the linked profiles, wherein the verified registration information includes legal name and one or more pictures of the verified registered user or of an agent of the verified registered user when the verified registered user is an entity, and wherein each verified registered user is permitted to register no more than once, each verified registered user is associated with no more than a single profile, and wherein a history of modification of the profile is recorded in the profile.

17. The system of claim 16, further comprising:

an interface for receiving a delete request from the first verified registered user for deleting the second verified registered user or receiving a delete request from the second register user for deleting the first verified registered user, wherein, responsive to the delete request, the processor:

severs the link between the first profile and the second profile, includes severance information in the relationship information of the first profile and the second profile, and prevents each of the verified registered users associated with a severed link to view the profile of the other verified registered user associated with the severed link.

18. The system of claim 16, further comprising:

wherein the input interface receives a flagging of a potentially misrepresentative profile by one of the verified registered users permitted to view the potentially misrepresentative profile and disputing one or more items of information in the potentially misrepresentative profile, wherein the processor:

generates a notice to be delivered to the verified registered user associated with the potentially misrepresentative profile by the output interface, removes disputed items of information when no correction or convincing response is received within a grace period, and includes a notation of the flagging in the potentially misrepresentative profile.

19. The system of claim 16, wherein the relationship information for each verified registered user includes an indication of existence of a relationship between the verified registered user and at least one other verified registered user, a characterization of a type of the relationship, name of the other verified registered user, and the date of inception, wherein, when the verified registered users are entities, the relationship information further includes keywords indicating a nature of jobs performed within the scope of the relationship, and wherein the relationship information is empty when the verified registered user has not declared any relationships.

20. A method for gradual exchange of information between two verified registered users of a system, the system having a database for storing input data, an input and output interface for receiving the input data and displaying output results, a processor for controlling the database, processing the input data and generating the output results, and a transceiver for establishing communication with a network through which the input data and the output results may be transmitted or received, the method comprising:

registering at least two prospective users of the system as the verified registered users after receiving registration information from each of the prospective users and verifying the registration information of each user by verifying authenticity of the registration information against the public or non-public records to obtain verified registration information, wherein the verified registration information includes legal name verified against the authentic records from at least one of government agencies and reliable private agencies;

establishing a profile for each verified registered user, each profile including keywords of one or more professional undertakings corresponding to one or more providers or clients of the verified registered user;

detecting common keywords between the profiles of at least two of the verified registered users being overlapping registered users;

providing a predetermined number of the common keywords to the overlapping registered users; and providing additional ones of the common keywords to the overlapping registered users, wherein the predetermined number is selected by the system, by one or more of the overlapping registered users, or by consensus of all of the overlapping registered users, wherein the additional ones of the common keywords are either provided to the overlapping registered users responsive to request and consensus by the overlapping registered users, or provided according to a gradually increasing pattern established by the system, wherein the provision of either the predetermined number of the common keywords or the additional ones of the common keywords is terminable by any of the overlapping registered users, wherein the providers or clients are among the verified registered users of the system, wherein each of the providers or clients is privy to and in agreement with the keywords corresponding to a proposal, product, or service provided by a provider or client to the verified registered user, wherein each verified registered user is permitted to register no more than once and each verified registered user is associated with no more than a single profile, and wherein a professional undertaking includes a contract or a proposal for a task or a service.

* * * * *